US008502120B2

(12) United States Patent
Bass et al.

(10) Patent No.: US 8,502,120 B2
(45) Date of Patent: Aug. 6, 2013

(54) INSULATING BLOCKS AND METHODS FOR INSTALLATION IN INSULATED CONDUCTOR HEATERS

(75) Inventors: Ronald Marshall Bass, Houston, TX (US); Robert Guy Harley, Spring, TX (US); Justin Michael Noel, The Woodlands, TX (US); Robert Anthony Shaffer, Cypress, TX (US)

(73) Assignee: Shell Oil Company, Houston, TX (US)

( * ) Notice: Subject to any disclaimer, the term of this patent is extended or adjusted under 35 U.S.C. 154(b) by 88 days.

(21) Appl. No.: 13/083,169

(22) Filed: Apr. 8, 2011

(65) Prior Publication Data

US 2011/0248018 A1 Oct. 13, 2011

Related U.S. Application Data

(60) Provisional application No. 61/322,664, filed on Apr. 9, 2010, provisional application No. 61/322,513, filed on Apr. 9, 2010.

(51) Int. Cl.
*H05B 3/44* (2006.01)
*H02B 3/00* (2006.01)

(52) U.S. Cl.
USPC ........... 219/544; 219/542; 219/546; 219/548; 219/534; 219/535; 29/611

(58) Field of Classification Search
USPC ....... 219/542, 544, 546, 548, 534–5; 29/611; 174/106 R
See application file for complete search history.

(56) References Cited

U.S. PATENT DOCUMENTS

| | | | |
|---|---|---|---|
| 1,457,690 | A | 6/1923 | Brine |
| 1,477,802 | A | 12/1923 | Beck |
| 2,011,710 | A | 8/1935 | Davis |
| 2,244,255 | A | 6/1941 | Looman |
| 2,680,086 | A | 6/1954 | Hollingsworth et al. |
| 2,757,739 | A | 8/1956 | Douglas et al. |
| 2,794,504 | A | 6/1957 | Carpenter |
| 2,942,223 | A | 6/1960 | Lennox et al. |
| 3,026,940 | A | 3/1962 | Spitz |
| 3,114,417 | A | 12/1963 | McCarthy |
| 3,131,763 | A | 5/1964 | Kunetka et al. |
| 3,141,924 | A | 7/1964 | Forney, Jr. |
| 3,149,672 | A | 10/1964 | Orkiszewski et al. |

(Continued)

FOREIGN PATENT DOCUMENTS

| | | |
|---|---|---|
| CA | 899987 | 5/1972 |
| CA | 1253555 | 5/1989 |

(Continued)

OTHER PUBLICATIONS

U.S. Patent and Trademark Office, Office Communication for co-pending U.S. Appl. No. 12/576,772; mailed Oct. 13, 2011, available in PAIR.

(Continued)

*Primary Examiner* — Shawntina Fuqua

(57) ABSTRACT

An insulated conductor heater may include an electrical conductor that produces heat when an electrical current is provided to the electrical conductor. An electrical insulator at least partially surrounds the electrical conductor. The electrical insulator comprises a resistivity that remains substantially constant, or increases, over time when the electrical conductor produces heat. An outer electrical conductor at least partially surrounds the electrical insulator.

19 Claims, 7 Drawing Sheets

U.S. PATENT DOCUMENTS

| | | | | |
|---|---|---|---|---|
| 3,207,220 | A | 9/1965 | Williams | |
| 3,299,202 | A | 1/1967 | Brown | |
| 3,316,344 | A | 4/1967 | Kidd et al. | |
| 3,342,267 | A | 9/1967 | Cotter et al. | |
| 3,410,977 | A | 11/1968 | Ando | |
| 3,477,058 | A | 11/1968 | Vedder et al. | |
| 3,492,463 | A | 1/1970 | Wringer et al. | |
| 3,515,837 | A | 6/1970 | Ando | |
| 3,547,192 | A | 12/1970 | Claridge et al. | |
| 3,562,401 | A | 2/1971 | Long | |
| 3,580,987 | A | 5/1971 | Priaroggia | |
| 3,614,387 | A | 10/1971 | Wrob et al. | |
| 3,629,551 | A | 12/1971 | Ando | |
| 3,657,520 | A | 4/1972 | Ragault | |
| 3,672,196 | A | 6/1972 | Levacher et al. | |
| 3,679,812 | A | 7/1972 | Owens | |
| 3,685,148 | A | 8/1972 | Garfinkel | |
| 3,757,860 | A | 9/1973 | Pritchett | |
| 3,761,599 | A | 9/1973 | Beatty | |
| 3,798,349 | A | 3/1974 | Thompson et al. | |
| 3,844,352 | A | 10/1974 | Garrett | |
| 3,859,503 | A | 1/1975 | Palone | |
| 3,893,961 | A | 7/1975 | Walton et al. | |
| 3,895,180 | A | 7/1975 | Plummer | |
| 3,896,260 | A | 7/1975 | Plummer | |
| 4,256,945 | A | 3/1981 | Carter et al. | |
| 4,280,046 | A | 7/1981 | Shimotori et al. | |
| 4,317,003 | A * | 2/1982 | Gray | 174/106 R |
| 4,344,483 | A | 8/1982 | Fisher et al. | |
| 4,354,053 | A | 10/1982 | Gold | |
| 4,368,452 | A | 1/1983 | Kerr, Jr. | |
| 4,370,518 | A | 1/1983 | Guzy | |
| 4,470,459 | A | 9/1984 | Copland | |
| 4,496,795 | A | 1/1985 | Konnik | |
| 4,520,229 | A | 5/1985 | Luzzi et al. | |
| 4,524,827 | A | 6/1985 | Bridges et al. | |
| 4,538,682 | A | 9/1985 | McManus et al. | |
| 4,549,073 | A | 10/1985 | Tamura et al. | |
| 4,570,715 | A | 2/1986 | Van Meurs et al. | |
| 4,572,299 | A | 2/1986 | Van Egmond et al. | |
| 4,585,066 | A | 4/1986 | Moore et al. | |
| 4,623,401 | A | 11/1986 | Derbyshire et al. | |
| 4,626,665 | A | 12/1986 | Fort, III | |
| 4,639,712 | A | 1/1987 | Kobayashi et al. | |
| 4,645,906 | A | 2/1987 | Yagnik et al. | |
| 4,662,437 | A | 5/1987 | Renfro et al. | |
| 4,694,907 | A | 9/1987 | Stahl et al. | |
| 4,695,713 | A | 9/1987 | Krumme | |
| 4,698,583 | A | 10/1987 | Sandberg | |
| 4,701,587 | A | 10/1987 | Carter et al. | |
| 4,704,514 | A | 11/1987 | Van Egmond et al. | |
| 4,716,960 | A | 1/1988 | Eastlund et al. | |
| 4,717,814 | A | 1/1988 | Krumme | |
| 4,733,057 | A | 3/1988 | Stanzel et al. | |
| 4,752,673 | A | 6/1988 | Krumme | |
| 4,785,163 | A | 11/1988 | Sandberg | |
| 4,794,226 | A | 12/1988 | Derbyshire | |
| 4,814,587 | A | 3/1989 | Carter | |
| 4,821,798 | A | 4/1989 | Bridges et al. | |
| 4,837,409 | A | 6/1989 | Klosin | |
| 4,849,611 | A | 7/1989 | Whitney et al. | |
| 4,859,200 | A | 8/1989 | McIntosh et al. | |
| 4,886,118 | A | 12/1989 | Van Meurs et al. | |
| 4,947,672 | A | 8/1990 | Pecora et al. | |
| 4,979,296 | A | 12/1990 | Langner et al. | |
| 4,985,313 | A | 1/1991 | Penneck et al. | |
| 5,040,601 | A | 8/1991 | Karlsson et al. | |
| 5,060,287 | A | 10/1991 | Van Egmond | |
| 5,065,501 | A | 11/1991 | Henschen et al. | |
| 5,065,818 | A | 11/1991 | Van Egmond | |
| 5,066,852 | A | 11/1991 | Willbanks | |
| 5,070,533 | A | 12/1991 | Bridges et al. | |
| 5,073,625 | A | 12/1991 | Derbyshire | |
| 5,082,494 | A | 1/1992 | Crompton | |
| 5,152,341 | A | 10/1992 | Kaservich | |
| 5,182,427 | A | 1/1993 | McGaffigan | |
| 5,189,283 | A | 2/1993 | Carl, Jr. et al. | |
| 5,207,273 | A | 5/1993 | Cates et al. | |
| 5,209,987 | A | 5/1993 | Penneck et al. | |
| 5,226,961 | A | 7/1993 | Nahm et al. | |
| 5,231,249 | A | 7/1993 | Kimura et al. | |
| 5,245,161 | A | 9/1993 | Okamoto | |
| 5,289,882 | A | 3/1994 | Moore | |
| 5,315,065 | A | 5/1994 | O'Donovan | |
| 5,316,492 | A | 5/1994 | Schaareman | |
| 5,403,977 | A | 4/1995 | Steptoe et al. | |
| 5,408,047 | A | 4/1995 | Wentzel | |
| 5,453,599 | A | 9/1995 | Hall, Jr. | |
| 5,483,414 | A | 1/1996 | Turtiainen | |
| 5,512,732 | A | 4/1996 | Yagnik et al. | |
| 5,553,478 | A | 9/1996 | Di Troia | |
| 5,579,575 | A | 12/1996 | Lamome et al. | |
| 5,619,611 | A | 4/1997 | Loschen et al. | |
| 5,621,844 | A | 4/1997 | Bridges | |
| 5,667,009 | A | 9/1997 | Moore | |
| 5,669,275 | A | 9/1997 | Mills | |
| 5,713,415 | A | 2/1998 | Bridges | |
| 5,782,301 | A | 7/1998 | Neuroth et al. | |
| 5,784,530 | A | 7/1998 | Bridges | |
| 5,788,376 | A | 8/1998 | Sultan et al. | |
| 5,801,332 | A | 9/1998 | Berger et al. | |
| 5,854,472 | A | 12/1998 | Wildi | |
| 5,875,283 | A | 2/1999 | Yane et al. | |
| 5,911,898 | A | 6/1999 | Jacobs et al. | |
| 5,987,745 | A | 11/1999 | Hoglund et al. | |
| 6,015,015 | A | 1/2000 | Luft et al. | |
| 6,023,554 | A | 2/2000 | Vinegar et al. | |
| 6,056,057 | A | 5/2000 | Vinegar et al. | |
| 6,079,499 | A | 6/2000 | Mikus et al. | |
| 6,102,122 | A | 8/2000 | de Rouffignac | |
| 6,288,372 | B1 | 9/2001 | Sandberg et al. | |
| 6,313,431 | B1 | 11/2001 | Schneider et al. | |
| 6,326,546 | B1 | 12/2001 | Karlsson | |
| 6,423,952 | B1 | 7/2002 | Meisiek | |
| 6,452,105 | B2 | 9/2002 | Badii et al. | |
| 6,581,684 | B2 | 6/2003 | Wellington et al. | |
| 6,583,351 | B1 | 6/2003 | Artman | |
| 6,585,046 | B2 | 7/2003 | Neuroth et al. | |
| 6,588,503 | B2 | 7/2003 | Karanikas et al. | |
| 6,588,504 | B2 | 7/2003 | Wellington et al. | |
| 6,591,906 | B2 | 7/2003 | Wellington et al. | |
| 6,591,907 | B2 | 7/2003 | Zhang et al. | |
| 6,607,033 | B2 | 8/2003 | Wellington et al. | |
| 6,609,570 | B2 | 8/2003 | Wellington et al. | |
| 6,688,387 | B1 | 2/2004 | Wellington et al. | |
| 6,698,515 | B2 | 3/2004 | Karanikas et al. | |
| 6,702,016 | B2 | 3/2004 | de Rouffignac et al. | |
| 6,712,135 | B2 | 3/2004 | Wellington et al. | |
| 6,712,136 | B2 | 3/2004 | de Rouffignac et al. | |
| 6,712,137 | B2 | 3/2004 | Vinegar et al. | |
| 6,715,546 | B2 | 4/2004 | Vinegar et al. | |
| 6,715,547 | B2 | 4/2004 | Vinegar et al. | |
| 6,715,548 | B2 | 4/2004 | Wellington et al. | |
| 6,715,549 | B2 | 4/2004 | Wellington et al. | |
| 6,719,047 | B2 | 4/2004 | Fowler et al. | |
| 6,722,429 | B2 | 4/2004 | de Rouffignac et al. | |
| 6,722,430 | B2 | 4/2004 | Vinegar et al. | |
| 6,722,431 | B2 | 4/2004 | Karanikas et al. | |
| 6,725,920 | B2 | 4/2004 | Zhang et al. | |
| 6,725,928 | B2 | 4/2004 | Vinegar et al. | |
| 6,729,395 | B2 | 5/2004 | Shahin, Jr. et al. | |
| 6,729,396 | B2 | 5/2004 | Vinegar et al. | |
| 6,729,397 | B2 | 5/2004 | Zhang et al. | |
| 6,729,401 | B2 | 5/2004 | Vinegar et al. | |
| 6,732,794 | B2 | 5/2004 | Wellington et al. | |
| 6,732,795 | B2 | 5/2004 | de Rouffignac et al. | |
| 6,732,796 | B2 | 5/2004 | Vinegar et al. | |
| 6,736,215 | B2 | 5/2004 | Maher et al. | |
| 6,739,393 | B2 | 5/2004 | Vinegar et al. | |
| 6,739,394 | B2 | 5/2004 | Vinegar et al. | |
| 6,742,587 | B2 | 6/2004 | Vinegar et al. | |
| 6,742,588 | B2 | 6/2004 | Wellington et al. | |
| 6,742,589 | B2 | 6/2004 | Berchenko et al. | |
| 6,742,593 | B2 | 6/2004 | Vinegar et al. | |
| 6,745,831 | B2 | 6/2004 | de Rouffignac et al. | |
| 6,745,832 | B2 | 6/2004 | Wellington et al. | |
| 6,745,837 | B2 | 6/2004 | Wellington et al. | |

| | | | |
|---|---|---|---|
| 6,749,021 | B2 | 6/2004 | Vinegar et al. |
| 6,752,210 | B2 | 6/2004 | de Rouffignac et al. |
| 6,758,268 | B2 | 7/2004 | Vinegar et al. |
| 6,761,216 | B2 | 7/2004 | Vinegar et al. |
| 6,769,483 | B2 | 8/2004 | de Rouffignac et al. |
| 6,769,485 | B2 | 8/2004 | Vinegar et al. |
| 6,782,947 | B2 | 8/2004 | de Rouffignac et al. |
| 6,789,625 | B2 | 9/2004 | de Rouffinac et al. |
| 6,805,195 | B2 | 10/2004 | Vinegar et al. |
| 6,820,688 | B2 | 11/2004 | Vinegar et al. |
| 6,849,800 | B2 | 2/2005 | Mazurkiewicz |
| 6,866,097 | B2 | 3/2005 | Vinegar et al. |
| 6,871,707 | B2 | 3/2005 | Karanikas et al. |
| 6,877,554 | B2 | 4/2005 | Stegemeier et al. |
| 6,877,555 | B2 | 4/2005 | Karanikas et al. |
| 6,880,633 | B2 | 4/2005 | Wellington et al. |
| 6,880,635 | B2 | 4/2005 | Vinegar et al. |
| 6,886,638 | B2 | 5/2005 | Ahmed et al. |
| 6,889,769 | B2 | 5/2005 | Wellington et al. |
| 6,896,053 | B2 | 5/2005 | Berchenko et al. |
| 6,902,003 | B2 | 6/2005 | Maher et al. |
| 6,902,004 | B2 | 6/2005 | de Rouffignac et al. |
| 6,910,536 | B2 | 6/2005 | Wellington et al. |
| 6,913,078 | B2 | 7/2005 | Shahin, Jr. et al. |
| 6,915,850 | B2 | 7/2005 | Vinegar et al. |
| 6,918,442 | B2 | 7/2005 | Wellington et al. |
| 6,918,443 | B2 | 7/2005 | Wellington et al. |
| 6,923,257 | B2 | 8/2005 | Wellington et al. |
| 6,923,258 | B2 | 8/2005 | Wellington et al. |
| 6,929,067 | B2 | 8/2005 | Vinegar et al. |
| 6,932,155 | B2 | 8/2005 | Vinegar et al. |
| 6,942,032 | B2 | 9/2005 | La Rovere et al. |
| 6,948,562 | B2 | 9/2005 | Wellington et al. |
| 6,948,563 | B2 | 9/2005 | Wellington et al. |
| 6,951,247 | B2 | 10/2005 | de Rouffignac et al. |
| 6,953,087 | B2 | 10/2005 | de Rouffignac et al. |
| 6,958,704 | B2 | 10/2005 | Vinegar et al. |
| 6,959,761 | B2 | 11/2005 | Berchenko et al. |
| 6,964,300 | B2 | 11/2005 | Vinegar et al. |
| 6,966,372 | B2 | 11/2005 | Wellington et al. |
| 6,966,374 | B2 | 11/2005 | Vinegar et al. |
| 6,969,123 | B2 | 11/2005 | Vinegar et al. |
| 6,973,967 | B2 | 12/2005 | Stegemeier et al. |
| 6,981,548 | B2 | 1/2006 | Wellington et al. |
| 6,991,032 | B2 | 1/2006 | Berchenko et al. |
| 6,991,033 | B2 | 1/2006 | Wellington et al. |
| 6,991,036 | B2 | 1/2006 | Sumnu-Dindoruk et al. |
| 6,991,045 | B2 | 1/2006 | Vinegar et al. |
| 6,994,160 | B2 | 2/2006 | Wellington et al. |
| 6,994,168 | B2 | 2/2006 | Wellington et al. |
| 6,994,169 | B2 | 2/2006 | Zhang et al. |
| 6,997,255 | B2 | 2/2006 | Wellington et al. |
| 6,997,518 | B2 | 2/2006 | Vinegar et al. |
| 7,004,247 | B2 | 2/2006 | Cole et al. |
| 7,004,251 | B2 | 2/2006 | Ward et al. |
| 7,011,154 | B2 | 3/2006 | Maher et al. |
| 7,036,583 | B2 | 5/2006 | de Rouffignac et al. |
| 7,040,397 | B2 | 5/2006 | de Rouffignac et al. |
| 7,040,398 | B2 | 5/2006 | Wellington et al. |
| 7,040,399 | B2 | 5/2006 | Wellington et al. |
| 7,040,400 | B2 | 5/2006 | de Rouffignac et al. |
| 7,051,807 | B2 | 5/2006 | Vinegar et al. |
| 7,051,808 | B1 | 5/2006 | Vinegar et al. |
| 7,055,600 | B2 | 6/2006 | Messier et al. |
| 7,063,145 | B2 | 6/2006 | Veenstra et al. |
| 7,066,254 | B2 | 6/2006 | Vinegar et al. |
| 7,066,257 | B2 | 6/2006 | Wellington et al. |
| 7,073,578 | B2 | 7/2006 | Vinegar et al. |
| 7,077,198 | B2 | 7/2006 | Vinegar et al. |
| 7,077,199 | B2 | 7/2006 | Vinegar et al. |
| 7,086,465 | B2 | 8/2006 | Wellington et al. |
| 7,086,468 | B2 | 8/2006 | de Rouffignac et al. |
| 7,090,013 | B2 | 8/2006 | Wellington et al. |
| 7,096,941 | B2 | 8/2006 | de Rouffignac et al. |
| 7,096,942 | B1 | 8/2006 | de Rouffignac et al. |
| 7,096,953 | B2 | 8/2006 | de Rouffignac et al. |
| 7,100,994 | B2 | 9/2006 | Vinegar et al. |
| 7,104,319 | B2 | 9/2006 | Vinegar et al. |
| 7,114,566 | B2 | 10/2006 | Vinegar et al. |
| 7,121,341 | B2 | 10/2006 | Vinegar et al. |
| 7,121,342 | B2 | 10/2006 | Vinegar et al. |
| 7,128,153 | B2 | 10/2006 | Vinegar et al. |
| 7,153,373 | B2 | 12/2006 | Maziasz et al. |
| 7,156,176 | B2 | 1/2007 | Vinegar et al. |
| 7,165,615 | B2 | 1/2007 | Vinegar et al. |
| 7,172,038 | B2 | 2/2007 | Terry et al. |
| 7,219,734 | B2 | 5/2007 | Bai et al. |
| 7,225,866 | B2 | 6/2007 | Berchenko et al. |
| 7,258,752 | B2 | 8/2007 | Maziasz et al. |
| 7,320,364 | B2 | 1/2008 | Fairbanks |
| 7,337,841 | B2 | 3/2008 | Ravie |
| 7,353,872 | B2 | 4/2008 | Sandberg et al. |
| 7,357,180 | B2 | 4/2008 | Vinegar et al. |
| 7,360,588 | B2 | 4/2008 | Vinegar et al. |
| 7,370,704 | B2 | 5/2008 | Harris |
| 7,383,877 | B2 | 6/2008 | Vinegar et al. |
| 7,398,823 | B2 | 7/2008 | Montgomery et al. |
| 7,405,358 | B2 | 7/2008 | Emerson |
| 7,424,915 | B2 | 9/2008 | Vinegar et al. |
| 7,431,076 | B2 | 10/2008 | Sandberg et al. |
| 7,435,037 | B2 | 10/2008 | McKinzie, II |
| 7,461,691 | B2 | 12/2008 | Vinegar et al. |
| 7,481,274 | B2 | 1/2009 | Vinegar et al. |
| 7,490,665 | B2 | 2/2009 | Sandberg et al. |
| 7,500,528 | B2 | 3/2009 | McKinzie, II et al. |
| 7,510,000 | B2 | 3/2009 | Pastor-Sanz et al. |
| 7,527,094 | B2 | 5/2009 | McKinzie et al. |
| 7,533,719 | B2 | 5/2009 | Hinson et al. |
| 7,540,324 | B2 | 6/2009 | de Rouffignac et al. |
| 7,546,873 | B2 | 6/2009 | Kim |
| 7,549,470 | B2 | 6/2009 | Vinegar et al. |
| 7,556,095 | B2 | 7/2009 | Vinegar |
| 7,556,096 | B2 | 7/2009 | Vinegar et al. |
| 7,559,367 | B2 | 7/2009 | Vinegar et al. |
| 7,559,368 | B2 | 7/2009 | Vinegar et al. |
| 7,562,706 | B2 | 7/2009 | Li et al. |
| 7,562,707 | B2 | 7/2009 | Miller |
| 7,575,052 | B2 | 8/2009 | Sandberg et al. |
| 7,575,053 | B2 | 8/2009 | Vinegar et al. |
| 7,581,589 | B2 | 9/2009 | Roes et al. |
| 7,584,789 | B2 | 9/2009 | Mo et al. |
| 7,591,310 | B2 | 9/2009 | Minderhoud et al. |
| 7,597,147 | B2 | 10/2009 | Vitek et al. |
| 7,604,052 | B2 | 10/2009 | Roes et al. |
| 7,610,962 | B2 | 11/2009 | Fowler |
| 7,631,689 | B2 | 12/2009 | Vinegar et al. |
| 7,631,690 | B2 | 12/2009 | Vinegar et al. |
| 7,635,023 | B2 | 12/2009 | Goldberg et al. |
| 7,635,024 | B2 | 12/2009 | Karanikas et al. |
| 7,635,025 | B2 | 12/2009 | Vinegar et al. |
| 7,640,980 | B2 | 1/2010 | Vinegar et al. |
| 7,644,765 | B2 | 1/2010 | Stegemeier et al. |
| 7,673,681 | B2 | 3/2010 | Vinegar et al. |
| 7,673,786 | B2 | 3/2010 | Menotti |
| 7,677,310 | B2 | 3/2010 | Vinegar et al. |
| 7,677,314 | B2 | 3/2010 | Hsu |
| 7,681,647 | B2 | 3/2010 | Mudunuri et al. |
| 7,683,296 | B2 | 3/2010 | Brady et al. |
| 7,703,513 | B2 | 4/2010 | Vinegar et al. |
| 7,717,171 | B2 | 5/2010 | Stegemeier et al. |
| 7,730,936 | B2 | 6/2010 | Hernandez-Solis et al. |
| 7,730,945 | B2 | 6/2010 | Pietersen et al. |
| 7,730,946 | B2 | 6/2010 | Vinegar et al. |
| 7,730,947 | B2 | 6/2010 | Stegemeier et al. |
| 7,735,935 | B2 | 6/2010 | Vinegar et al. |
| 7,764,871 | B2 | 7/2010 | Rodegher |
| 7,785,427 | B2 | 8/2010 | Maziasz et al. |
| 7,793,722 | B2 | 9/2010 | Vinegar et al. |
| 7,798,220 | B2 | 9/2010 | Vinegar et al. |
| 7,798,221 | B2 | 9/2010 | Vinegar et al. |
| 7,831,133 | B2 | 11/2010 | Vinegar et al. |
| 7,831,134 | B2 | 11/2010 | Vinegar et al. |
| 7,832,484 | B2 | 11/2010 | Nguyen et al. |
| 7,841,401 | B2 | 11/2010 | Kuhlman et al. |
| 7,841,408 | B2 | 11/2010 | Vinegar |
| 7,841,425 | B2 | 11/2010 | Mansure et al. |
| 7,845,411 | B2 | 12/2010 | Vinegar et al. |
| 7,849,922 | B2 | 12/2010 | Vinegar et al. |

| | | | |
|---|---|---|---|
| 7,860,377 | B2 | 12/2010 | Vinegar et al. |
| 7,866,385 | B2 | 1/2011 | Lambirth |
| 7,866,386 | B2 | 1/2011 | Beer |
| 7,866,388 | B2 | 1/2011 | Bravo |
| 7,912,358 | B2 | 3/2011 | Stone et al. |
| 7,931,086 | B2 | 4/2011 | Nguyen et al. |
| 7,942,197 | B2 | 5/2011 | Fairbanks et al. |
| 7,942,203 | B2 | 5/2011 | Vinegar et al. |
| 7,950,453 | B2 | 5/2011 | Farmayan et al. |
| 7,986,869 | B2 | 7/2011 | Vinegar et al. |
| 8,011,451 | B2 | 9/2011 | McDonald |
| 8,027,571 | B2 | 9/2011 | Vinegar et al. |
| 8,042,610 | B2 | 10/2011 | Harris et al. |
| 8,146,661 | B2 | 4/2012 | Bravo et al. |
| 8,146,669 | B2 | 4/2012 | Mason |
| 8,151,880 | B2 | 4/2012 | Roes et al. |
| 8,151,907 | B2 | 4/2012 | MacDonald |
| 8,162,059 | B2 | 4/2012 | Nguyen et al. |
| 8,162,405 | B2 | 4/2012 | Burns et al. |
| 8,172,335 | B2 | 5/2012 | Burns et al. |
| 8,177,305 | B2 | 5/2012 | Burns et al. |
| 8,191,630 | B2 | 6/2012 | Stegemeier et al. |
| 8,192,682 | B2 | 6/2012 | Maziasz et al. |
| 8,196,658 | B2 | 6/2012 | Miller et al. |
| 8,200,072 | B2 | 6/2012 | Vinegar et al. |
| 8,220,539 | B2 | 7/2012 | Vinegar et al. |
| 8,224,164 | B2 | 7/2012 | Sandberg et al. |
| 8,224,165 | B2 | 7/2012 | Vinegar et al. |
| 8,238,730 | B2 | 8/2012 | Sandberg et al. |
| 8,240,774 | B2 | 8/2012 | Vinegar et al. |
| 8,256,512 | B2 | 9/2012 | Stanecki |
| 8,257,112 | B2 | 9/2012 | Tilley |
| 8,261,832 | B2 | 9/2012 | Ryan |
| 8,267,170 | B2 | 9/2012 | Fowler et al. |
| 8,267,185 | B2 | 9/2012 | Ocampos et al. |
| 8,276,661 | B2 | 10/2012 | Costello et al. |
| 8,281,861 | B2 | 10/2012 | Nguyen et al. |
| 2002/0027001 | A1 | 3/2002 | Wellington et al. |
| 2002/0028070 | A1 | 3/2002 | Holen |
| 2002/0033253 | A1 | 3/2002 | de Rouffignac et al. |
| 2002/0036089 | A1 | 3/2002 | Vinegar et al. |
| 2002/0038069 | A1 | 3/2002 | Wellington et al. |
| 2002/0040779 | A1 | 4/2002 | Wellington et al. |
| 2002/0040780 | A1 | 4/2002 | Wellington et al. |
| 2002/0053431 | A1 | 5/2002 | Wellington et al. |
| 2002/0076212 | A1 | 6/2002 | Zhang et al. |
| 2003/0066642 | A1 | 4/2003 | Wellington et al. |
| 2003/0079877 | A1 | 5/2003 | Wellington et al. |
| 2003/0085034 | A1 | 5/2003 | Wellington et al. |
| 2003/0146002 | A1 | 8/2003 | Vinegar et al. |
| 2003/0196789 | A1 | 10/2003 | Wellington et al. |
| 2003/0201098 | A1 | 10/2003 | Karanikas et al. |
| 2004/0140096 | A1 | 7/2004 | Sandberg et al. |
| 2004/0146288 | A1 | 7/2004 | Vinegar et al. |
| 2004/0163801 | A1 | 8/2004 | Dalrymple et al. |
| 2005/0006097 | A1 | 1/2005 | Sandberg et al. |
| 2005/0006128 | A1 | 1/2005 | Mita et al. |
| 2005/0269313 | A1 | 12/2005 | Vinegar |
| 2006/0289536 | A1 | 12/2006 | Vinegar et al. |
| 2007/0045268 | A1 | 3/2007 | Vinegar et al. |
| 2007/0127897 | A1 | 6/2007 | John et al. |
| 2007/0131428 | A1 | 6/2007 | den Boestert et al. |
| 2007/0133960 | A1 | 6/2007 | Vinegar et al. |
| 2007/0173122 | A1 | 7/2007 | Matsuoka |
| 2008/0073104 | A1 | 3/2008 | Barberree et al. |
| 2008/0135244 | A1 | 6/2008 | Miller |
| 2008/0173442 | A1 | 7/2008 | Vinegar et al. |
| 2008/0217321 | A1 | 9/2008 | Vinegar et al. |
| 2009/0090158 | A1 | 4/2009 | Davidson et al. |
| 2009/0095478 | A1 | 4/2009 | Karanikas et al. |
| 2009/0095479 | A1 | 4/2009 | Karanikas et al. |
| 2009/0120646 | A1 | 5/2009 | Kim et al. |
| 2009/0126929 | A1 | 5/2009 | Vinegar |
| 2009/0189617 | A1 | 7/2009 | Burns et al. |
| 2009/0194269 | A1 | 8/2009 | Vinegar |
| 2009/0194286 | A1 | 8/2009 | Mason |
| 2009/0194287 | A1 | 8/2009 | Nguyen et al. |
| 2009/0194329 | A1 | 8/2009 | Guimerans et al. |
| 2009/0194333 | A1 | 8/2009 | MacDonald |
| 2009/0194524 | A1 | 8/2009 | Kim et al. |
| 2009/0200022 | A1 | 8/2009 | Bravo et al. |
| 2009/0200023 | A1 | 8/2009 | Costello et al. |
| 2009/0200031 | A1 | 8/2009 | Miller et al. |
| 2009/0200290 | A1 | 8/2009 | Cardinal et al. |
| 2009/0200854 | A1 | 8/2009 | Vinegar |
| 2009/0260824 | A1 | 10/2009 | Burns et al. |
| 2009/0272526 | A1 | 11/2009 | Burns et al. |
| 2009/0272533 | A1 | 11/2009 | Burns et al. |
| 2009/0272535 | A1 | 11/2009 | Burns et al. |
| 2009/0272536 | A1 | 11/2009 | Burns et al. |
| 2009/0272578 | A1 | 11/2009 | MacDonald |
| 2009/0301724 | A1 | 12/2009 | Roes et al. |
| 2009/0321417 | A1 | 12/2009 | Burns et al. |
| 2010/0038112 | A1 | 2/2010 | Grether |
| 2010/0044781 | A1 | 2/2010 | Tanabe |
| 2010/0071903 | A1 | 3/2010 | Prince-Wright et al. |
| 2010/0071904 | A1 | 3/2010 | Burns et al. |
| 2010/0089584 | A1 | 4/2010 | Burns |
| 2010/0089586 | A1 | 4/2010 | Stanecki |
| 2010/0096137 | A1 | 4/2010 | Nguyen et al. |
| 2010/0101783 | A1 | 4/2010 | Vinegar et al. |
| 2010/0101784 | A1 | 4/2010 | Vinegar et al. |
| 2010/0101794 | A1 | 4/2010 | Ryan |
| 2010/0108310 | A1 | 5/2010 | Fowler et al. |
| 2010/0108379 | A1 | 5/2010 | Edbury et al. |
| 2010/0147521 | A1 | 6/2010 | Xie et al. |
| 2010/0147522 | A1 | 6/2010 | Xie et al. |
| 2010/0155070 | A1 | 6/2010 | Roes et al. |
| 2010/0190649 | A1 | 7/2010 | Doll et al. |
| 2010/0206570 | A1 | 8/2010 | Ocampos et al. |
| 2010/0224368 | A1 | 9/2010 | Mason |
| 2010/0258265 | A1 | 10/2010 | Karanikas et al. |
| 2010/0258290 | A1 | 10/2010 | Bass |
| 2010/0258291 | A1 | 10/2010 | de St. Remey et al. |
| 2010/0258309 | A1 | 10/2010 | Ayodele et al. |
| 2010/0288497 | A1 | 11/2010 | Burnham et al. |
| 2011/0042084 | A1 | 2/2011 | Bos et al. |
| 2011/0042085 | A1 | 2/2011 | Diehl |
| 2011/0124223 | A1 | 5/2011 | Tilley et al. |
| 2011/0124228 | A1 | 5/2011 | Coles et al. |
| 2011/0132661 | A1 | 6/2011 | Harmason et al. |
| 2011/0134958 | A1 | 6/2011 | Aroa et al. |
| 2011/0247805 | A1 | 10/2011 | de St. Remey et al. |
| 2011/0247817 | A1 | 10/2011 | Bass et al. |
| 2011/0247818 | A1 | 10/2011 | Bass et al. |
| 2012/0084978 | A1 | 4/2012 | Hartford et al. |
| 2012/0085564 | A1 | 4/2012 | D'Angelo, III et al. |
| 2012/0090174 | A1 | 4/2012 | Harmason et al. |
| 2012/0110845 | A1 | 5/2012 | Burns et al. |
| 2012/0118634 | A1 | 5/2012 | Coles et al. |
| 2012/0193099 | A1 | 8/2012 | Vinegar et al. |

FOREIGN PATENT DOCUMENTS

| | | |
|---|---|---|
| CA | 1288043 | 8/1991 |
| EP | 107927 | 5/1984 |
| EP | 130671 | 9/1985 |
| GB | 676543 | 7/1952 |
| GB | 1010023 | 11/1965 |
| GB | 1204405 | 9/1970 |
| JP | 2000340350 | 12/2000 |
| WO | 97/23924 | 7/1997 |
| WO | 00/19061 | 4/2000 |

OTHER PUBLICATIONS

PCT International Search Report and Written Opinon for International Application No. PCT/US2011/031570 mailed Jun. 28, 2011, 6 pages.

McGee et al. "Electrical Heating with Horizontal Wells, The heat Transfer Problem, " International Conference on Horizontal Well Tehcnology, Calgary, Alberta Canada, 1996; 14 pages.

"IEEE Recommended Practice for Electrical Impedance, Induction, and Skin Effect Heating of Pipelines and Vessels," IEEE Std. 844-200, 2000; 6 pages.

U.S. Patent and Trademark Offices, Office Communication for co-pending U.S. Appl. No. 12/901,248; mailed Jan. 17, 2012.

Bosch et al. "Evaluation of Downhole Electric Impedance Heating Systems for Paraffin Control in Oil Wells," IEEE Transactions on Industrial Applications, 1992, vol. 28; pp. 190-194.
Bosch et al., "Evaluation of Downhole Electric Impedance Heating Systems for Paraffin Control in Oil Wells," Industry Applications Society 37th Annual Petroleum and Chemical Industry Conference; The Institute of Electrical and Electronics Engineers Inc., Sep. 1990, pp. 223-227.
Rangel-German et al., "Electrical-Heating-Assisted Recovery for Heavy Oil", pp. 1-43. 2004.
Kovscek, Anthony R., "Reservoir Engineering analysis of Novel Thermal Oil Recovery Techniques applicable to Alaskan North Slope Heavy Oils", pp. 1-6.
PCT "International Search Report and Written Opinion" for International Application No. PCT/US10/52026, mailed, Dec. 17, 2010, 11 pages.
Swedish shale oil-Production methods in Sweden, Organisation for European Economic Cooperation, 1952, (70 pages).
PCT "International Search Report and Written Opinion" for International Application No. PCT/US10/52022, mailed, Dec. 10, 2010, 8 pages.
PCT "International Search Report and Written Opinion" for International Application No. PCT/US10/52027, mailed, Dec. 13, 2010, 8 pages.
Boggs, "The Case for Frequency Domain PD Testing in the Context of Distribution Cable", Electrical Insulation Magazine, IEEE, vol. 19, Issue 4, Jul.-Aug. 2003, pp. 13-19.
PCT "International Search Report and Written Opinion" for International Application No. PCT/US2011/031543, mailed, Jun. 24, 2011; 5 pages.
PCT "International Search Report and Written Opinion" for International Application No. PCT/US2011/055213, mailed, Jan. 31, 2012;7 pages.
U.S. Patent and Trademark Office, Office Communication for U.S. Appl. No. 12/106,139; mailed Apr. 10, 2012, available in PAIR.
PCT International Search Report for International Application No. PCT/US2011/031565 mailed Jun. 10, 2011, 2 pages.
U.S. Patent and Trademark Office, Office Communication for U.S. Appl. No. 11/788,869; mailed May 4, 2012, available in PAIR.
U.S. Patent and Trademark Office, Office Communication for U.S. Appl. No. 12/576,772; mailed May 1, 2012, available in PAIR.
U.S. Patent and Trademark Office, Office Communication for U.S. Appl. No. 12/106,065; mailed Jun. 27, 2012, available in PAIR.
U.S. Patent and Trademark Office, Office Communication for U.S. Appl. No. 12/901,237; mailed Aug. 2, 2012, available in PAIR.
U.S. Patent and Trademark Office, Office Communication for U.S. Appl. No. 12/757,661; mailed Aug. 27, 2012, available in PAIR.
U.S. Patent and Trademark Office, Office Communication for U.S. Appl. No. 12/250,346; mailed Sep. 5, 2012, available in PAIR.
U.S. Patent and Trademark Office, Office Communication for U.S. Appl. No. 13/083,169; mailed Sep. 11, 2012, available in PAIR.
U.S. Patent and Trademark Office, "Office Communication," for U.S. Appl. No. 11/113,353 mailed Sep. 20, 2012; available in PAIR.

* cited by examiner

INSULATING BLOCKS AND METHODS FOR INSTALLATION IN INSULATED CONDUCTOR HEATERS

PRIORITY CLAIM

This patent application claims priority to U.S. Provisional Patent No. 61/322,664 entitled "HEATER TECHNOLOGY FOR TREATING SUBSURFACE FORMATIONS" to Bass et al. filed on Apr. 9, 2010; U.S. Provisional Patent No. 61/322,513 entitled "TREATMENT METHODOLOGIES FOR SUBSURFACE HYDROCARBON CONTAINING FORMATIONS" to Bass et al. filed on Apr. 9, 2010; and International Patent Application No. PCT/US11/31543 entitled "INSULATING BLOCKS AND METHODS FOR INSTALLATION IN INSULATED CONDUCTOR HEATERS" to Bass et al. filed on Apr. 7, 2011, all of which are incorporated by reference in their entirety.

RELATED PATENTS

This patent application incorporates by reference in its entirety each of U.S. Pat. No. 6,688,387 to Wellington et al.; U.S. Pat. No. 6,991,036 to Sumnu-Dindoruk et al.; U.S. Pat. No. 6,698,515 to Karanikas et al.; U.S. Pat. No. 6,880,633 to Wellington et al.; U.S. Pat. No. 6,782,947 to de Rouffignac et al.; U.S. Pat. No. 6,991,045 to Vinegar et al.; U.S. Pat. No. 7,073,578 to Vinegar et al.; U.S. Pat. No. 7,121,342 to Vinegar et al.; U.S. Pat. No. 7,320,364 to Fairbanks; U.S. Pat. No. 7,527,094 to McKinzie et al.; U.S. Pat. No. 7,584,789 to Mo et al.; U.S. Pat. No. 7,533,719 to Hinson et al.; U.S. Pat. No. 7,562,707 to Miller; U.S. Pat. No. 7,841,408 to Vinegar et al.; and U.S. Pat. No. 7,866,388 to Bravo; U.S. Patent Application Publication Nos. 2010-0071903 to Prince-Wright et al. and 2010-0096137 to Nguyen et al.

BACKGROUND

1. Field of the Invention

The present invention relates to systems and methods used for heating subsurface formations. More particularly, the invention relates to systems and methods for heating subsurface hydrocarbon containing formations.

2. Description of Related Art

Hydrocarbons obtained from subterranean formations are often used as energy resources, as feedstocks, and as consumer products. Concerns over depletion of available hydrocarbon resources and concerns over declining overall quality of produced hydrocarbons have led to development of processes for more efficient recovery, processing and/or use of available hydrocarbon resources. In situ processes may be used to remove hydrocarbon materials from subterranean formations that were previously inaccessible and/or too expensive to extract using available methods. Chemical and/or physical properties of hydrocarbon material in a subterranean formation may need to be changed to allow hydrocarbon material to be more easily removed from the subterranean formation and/or increase the value of the hydrocarbon material. The chemical and physical changes may include in situ reactions that produce removable fluids, composition changes, solubility changes, density changes, phase changes, and/or viscosity changes of the hydrocarbon material in the formation.

Heaters may be placed in wellbores to heat a formation during an in situ process. There are many different types of heaters which may be used to heat the formation. Examples of in situ processes utilizing downhole heaters are illustrated in U.S. Pat. No. 2,634,961 to Ljungstrom; U.S. Pat. No. 2,732,195 to Ljungstrom; U.S. Pat. No. 2,780,450 to Ljungstrom; U.S. Pat. No. 2,789,805 to Ljungstrom; U.S. Pat. No. 2,923,535 to Ljungstrom; U.S. Pat. No. 4,886,118 to Van Meurs et al.; and U.S. Pat. No. 6,688,387 to Wellington et al.; each of which is incorporated by reference as if fully set forth herein.

Mineral insulated (MI) cables (insulated conductors) for use in subsurface applications, such as heating hydrocarbon containing formations in some applications, are longer, may have larger outside diameters, and may operate at higher voltages and temperatures than what is typical in the MI cable industry. There are many potential problems during manufacture and/or assembly of long length insulated conductors.

For example, there are potential electrical and/or mechanical problems due to degradation over time of the electrical insulator used in the insulated conductor. There are also potential problems with electrical insulators to overcome during assembly of the insulated conductor heater. Problems such as core bulge or other mechanical defects may occur during assembly of the insulated conductor heater. Such occurrences may lead to electrical problems during use of the heater and may potentially render the heater inoperable for its intended purpose.

In addition, there may be problems with increased stress on the insulated conductors during assembly and/or installation into the subsurface of the insulated conductors. For example, winding and unwinding of the insulated conductors on spools used for transport and installation of the insulated conductors may lead to mechanical stress on the electrical insulators and/or other components in the insulated conductors. Thus, more reliable systems and methods are needed to reduce or eliminate potential problems during manufacture, assembly, and/or installation of insulated conductors.

SUMMARY

Embodiments described herein generally relate to systems, methods, and heaters for treating a subsurface formation. Embodiments described herein also generally relate to heaters that have novel components therein. Such heaters can be obtained by using the systems and methods described herein.

In certain embodiments, the invention provides one or more systems, methods, and/or heaters. In some embodiments, the systems, methods, and/or heaters are used for treating a subsurface formation.

In certain embodiments, an insulated conductor heater includes: an electrical conductor configured to produce heat when an electrical current is provided to the electrical conductor; an electrical insulator at least partially surrounding the electrical conductor, wherein the electrical insulator comprises a resistivity that remains substantially constant, or increases, over time when the electrical conductor produces heat; and an outer electrical conductor at least partially surrounding the electrical insulator.

In certain embodiments, an insulated conductor heater includes: an electrical conductor configured to produce heat when an electrical current is provided to the electrical conductor; an electrical insulator at least partially surrounding the electrical conductor, wherein the electrical insulator comprises one or more blocks of insulation, and wherein the blocks of insulation comprise a resistivity that remains substantially constant, or increases, over time when the electrical conductor produces heat; and an outer electrical conductor at least partially surrounding the electrical insulator.

In certain embodiments, a method for forming at least part of an insulated conductor includes: placing a first partially cylindrical portion of an insulated conductor between at least part of an elongated, cylindrical inner electrical conductor and at least part of a partially cylindrical, elongated outer electrical conductor; placing at least one additional partially cylindrical portion of the insulated conductor between at least part of the inner electrical conductor and at least part of the partially formed outer electrical conductor, wherein the additional portion of the insulated conductor is horizontally displaced from the first portion of the insulated conductor along a length of the part of the elongated outer electrical conductor; and moving the additional portion of the insulated conductor towards the first portion of the insulated conductor with a selected amount of force such that the additional portion of the insulated conductor and the first portion of the insulated conductor are substantially compressed against each other.

In further embodiments, features from specific embodiments may be combined with features from other embodiments. For example, features from one embodiment may be combined with features from any of the other embodiments.

In further embodiments, treating a subsurface formation is performed using any of the methods, systems, power supplies, or heaters described herein.

In further embodiments, additional features may be added to the specific embodiments described herein.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings.

Figure 1:
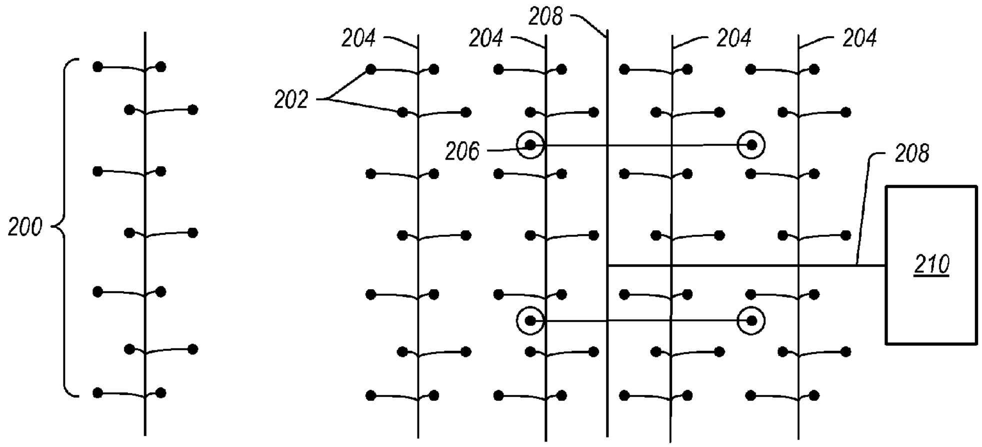
FIG. 1 shows a schematic view of an embodiment of a portion of an in situ heat treatment system for treating a hydrocarbon containing formation.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION

The following description generally relates to systems and methods for treating hydrocarbons in the formations. Such formations may be treated to yield hydrocarbon products, hydrogen, and other products.

"Alternating current (AC)" refers to a time-varying current that reverses direction substantially sinusoidally. AC produces skin effect electricity flow in a ferromagnetic conductor.

In the context of reduced heat output heating systems, apparatus, and methods, the term "automatically" means such systems, apparatus, and methods function in a certain way without the use of external control (for example, external controllers such as a controller with a temperature sensor and a feedback loop, PID controller, or predictive controller).

"Coupled" means either a direct connection or an indirect connection (for example, one or more intervening connections) between one or more objects or components. The phrase "directly connected" means a direct connection between objects or components such that the objects or components are connected directly to each other so that the objects or components operate in a "point of use" manner.

"Curie temperature" is the temperature above which a ferromagnetic material loses all of its ferromagnetic properties. In addition to losing all of its ferromagnetic properties above the Curie temperature, the ferromagnetic material begins to lose its ferromagnetic properties when an increasing electrical current is passed through the ferromagnetic material.

A "formation" includes one or more hydrocarbon containing layers, one or more non-hydrocarbon layers, an overburden, and/or an underburden. "Hydrocarbon layers" refer to layers in the formation that contain hydrocarbons. The hydrocarbon layers may contain non-hydrocarbon material and hydrocarbon material. The "overburden" and/or the "underburden" include one or more different types of impermeable materials. For example, the overburden and/or underburden may include rock, shale, mudstone, or wet/tight carbonate. In some embodiments of in situ heat treatment processes, the overburden and/or the underburden may include a hydrocarbon containing layer or hydrocarbon containing layers that are relatively impermeable and are not subjected to temperatures during in situ heat treatment processing that result in significant characteristic changes of the hydrocarbon containing layers of the overburden and/or the underburden. For example, the underburden may contain shale or mudstone, but the underburden is not allowed to heat to pyrolysis temperatures during the in situ heat treatment process. In some cases, the overburden and/or the underburden may be somewhat permeable.

"Formation fluids" refer to fluids present in a formation and may include pyrolyzation fluid, synthesis gas, mobilized hydrocarbons, and water (steam). Formation fluids may include hydrocarbon fluids as well as non-hydrocarbon fluids. The term "mobilized fluid" refers to fluids in a hydrocarbon containing formation that are able to flow as a result of thermal treatment of the formation. "Produced fluids" refer to fluids removed from the formation.

"Heat flux" is a flow of energy per unit of area per unit of time (for example, Watts/meter$^2$).

A "heat source" is any system for providing heat to at least a portion of a formation substantially by conductive and/or radiative heat transfer. For example, a heat source may include electrically conducting materials and/or electric heaters such as an insulated conductor, an elongated member, and/or a conductor disposed in a conduit. A heat source may also include systems that generate heat by burning a fuel external to or in a formation. The systems may be surface burners, downhole gas burners, flameless distributed combustors, and natural distributed combustors. In some embodiments, heat provided to or generated in one or more heat sources may be supplied by other sources of energy. The other sources of energy may directly heat a formation, or the energy may be applied to a transfer medium that directly or indirectly heats the formation. It is to be understood that one or more heat sources that are applying heat to a formation may use different sources of energy. Thus, for example, for a given formation some heat sources may supply heat from electrically conducting materials, electric resistance heaters, some heat sources may provide heat from combustion, and some heat sources may provide heat from one or more other energy sources (for example, chemical reactions, solar energy, wind energy, biomass, or other sources of renewable energy). A chemical reaction may include an exothermic reaction (for example, an oxidation reaction). A heat source may also include an electrically conducting material and/or a heater that provides heat to a zone proximate and/or surrounding a heating location such as a heater well.

A "heater" is any system or heat source for generating heat in a well or a near wellbore region. Heaters may be, but are not limited to, electric heaters, burners, combustors that react with material in or produced from a formation, and/or combinations thereof.

"Hydrocarbons" are generally defined as molecules formed primarily by carbon and hydrogen atoms. Hydrocarbons may also include other elements such as, but not limited to, halogens, metallic elements, nitrogen, oxygen, and/or sulfur. Hydrocarbons may be, but are not limited to, kerogen, bitumen, pyrobitumen, oils, natural mineral waxes, and asphaltites. Hydrocarbons may be located in or adjacent to mineral matrices in the earth. Matrices may include, but are not limited to, sedimentary rock, sands, silicilytes, carbonates, diatomites, and other porous media. "Hydrocarbon fluids" are fluids that include hydrocarbons. Hydrocarbon fluids may include, entrain, or be entrained in non-hydrocarbon fluids such as hydrogen, nitrogen, carbon monoxide, carbon dioxide, hydrogen sulfide, water, and ammonia.

An "in situ conversion process" refers to a process of heating a hydrocarbon containing formation from heat sources to raise the temperature of at least a portion of the formation above a pyrolysis temperature so that pyrolyzation fluid is produced in the formation.

An "in situ heat treatment process" refers to a process of heating a hydrocarbon containing formation with heat sources to raise the temperature of at least a portion of the formation above a temperature that results in mobilized fluid, visbreaking, and/or pyrolysis of hydrocarbon containing material so that mobilized fluids, visbroken fluids, and/or pyrolyzation fluids are produced in the formation.

"Insulated conductor" refers to any elongated material that is able to conduct electricity and that is covered, in whole or in part, by an electrically insulating material.

"Modulated direct current (DC)" refers to any substantially non-sinusoidal time-varying current that produces skin effect electricity flow in a ferromagnetic conductor.

"Nitride" refers to a compound of nitrogen and one or more other elements of the Periodic Table. Nitrides include, but are not limited to, silicon nitride, boron nitride, or alumina nitride.

"Perforations" include openings, slits, apertures, or holes in a wall of a conduit, tubular, pipe or other flow pathway that allow flow into or out of the conduit, tubular, pipe or other flow pathway.

"Phase transformation temperature" of a ferromagnetic material refers to a temperature or a temperature range during which the material undergoes a phase change (for example, from ferrite to austenite) that decreases the magnetic permeability of the ferromagnetic material. The reduction in magnetic permeability is similar to reduction in magnetic permeability due to the magnetic transition of the ferromagnetic material at the Curie temperature.

"Pyrolysis" is the breaking of chemical bonds due to the application of heat. For example, pyrolysis may include transforming a compound into one or more other substances by heat alone. Heat may be transferred to a section of the formation to cause pyrolysis.

"Pyrolyzation fluids" or "pyrolysis products" refers to fluid produced substantially during pyrolysis of hydrocarbons. Fluid produced by pyrolysis reactions may mix with other fluids in a formation. The mixture would be considered pyrolyzation fluid or pyrolyzation product. As used herein, "pyrolysis zone" refers to a volume of a formation (for example, a relatively permeable formation such as a tar sands formation) that is reacted or reacting to form a pyrolyzation fluid.

"Superposition of heat" refers to providing heat from two or more heat sources to a selected section of a formation such that the temperature of the formation at least at one location between the heat sources is influenced by the heat sources.

"Temperature limited heater" generally refers to a heater that regulates heat output (for example, reduces heat output) above a specified temperature without the use of external controls such as temperature controllers, power regulators, rectifiers, or other devices. Temperature limited heaters may be AC (alternating current) or modulated (for example, "chopped") DC (direct current) powered electrical resistance heaters.

"Thickness" of a layer refers to the thickness of a cross section of the layer, wherein the cross section is normal to a face of the layer.

"Time-varying current" refers to electrical current that produces skin effect electricity flow in a ferromagnetic conductor and has a magnitude that varies with time. Time-varying current includes both alternating current (AC) and modulated direct current (DC).

"Turndown ratio" for the temperature limited heater in which current is applied directly to the heater is the ratio of the highest AC or modulated DC resistance below the Curie temperature to the lowest resistance above the Curie temperature for a given current. Turndown ratio for an inductive heater is the ratio of the highest heat output below the Curie temperature to the lowest heat output above the Curie temperature for a given current applied to the heater.

A "u-shaped wellbore" refers to a wellbore that extends from a first opening in the formation, through at least a portion of the formation, and out through a second opening in the formation. In this context, the wellbore may be only roughly in the shape of a "v" or "u", with the understanding that the "legs" of the "u" do not need to be parallel to each other, or perpendicular to the "bottom" of the "u" for the wellbore to be considered "u-shaped".

The term "wellbore" refers to a hole in a formation made by drilling or insertion of a conduit into the formation. A wellbore may have a substantially circular cross section, or another cross-sectional shape. As used herein, the terms "well" and "opening," when referring to an opening in the formation may be used interchangeably with the term "wellbore."

A formation may be treated in various ways to produce many different products. Different stages or processes may be used to treat the formation during an in situ heat treatment process. In some embodiments, one or more sections of the formation are solution mined to remove soluble minerals from the sections. Solution mining minerals may be performed before, during, and/or after the in situ heat treatment process. In some embodiments, the average temperature of one or more sections being solution mined may be maintained below about 120° C.

In some embodiments, one or more sections of the formation are heated to remove water from the sections and/or to remove methane and other volatile hydrocarbons from the sections. In some embodiments, the average temperature may be raised from ambient temperature to temperatures below about 220° C. during removal of water and volatile hydrocarbons.

In some embodiments, one or more sections of the formation are heated to temperatures that allow for movement and/or visbreaking of hydrocarbons in the formation. In some embodiments, the average temperature of one or more sections of the formation are raised to mobilization temperatures of hydrocarbons in the sections (for example, to temperatures ranging from 100° C. to 250° C., from 120° C. to 240° C., or from 150° C. to 230° C.).

In some embodiments, one or more sections are heated to temperatures that allow for pyrolysis reactions in the formation. In some embodiments, the average temperature of one or more sections of the formation may be raised to pyrolysis temperatures of hydrocarbons in the sections (for example, temperatures ranging from 230° C. to 900° C., from 240° C. to 400° C. or from 250° C. to 350° C.).

Heating the hydrocarbon containing formation with a plurality of heat sources may establish thermal gradients around the heat sources that raise the temperature of hydrocarbons in the formation to desired temperatures at desired heating rates. The rate of temperature increase through the mobilization temperature range and/or the pyrolysis temperature range for desired products may affect the quality and quantity of the formation fluids produced from the hydrocarbon containing formation. Slowly raising the temperature of the formation through the mobilization temperature range and/or pyrolysis temperature range may allow for the production of high quality, high API gravity hydrocarbons from the formation. Slowly raising the temperature of the formation through the mobilization temperature range and/or pyrolysis temperature range may allow for the removal of a large amount of the hydrocarbons present in the formation as hydrocarbon product.

In some in situ heat treatment embodiments, a portion of the formation is heated to a desired temperature instead of slowly raising the temperature through a temperature range. In some embodiments, the desired temperature is 300° C., 325° C., or 350° C. Other temperatures may be selected as the desired temperature.

Superposition of heat from heat sources allows the desired temperature to be relatively quickly and efficiently established in the formation. Energy input into the formation from the heat sources may be adjusted to maintain the temperature in the formation substantially at a desired temperature.

Mobilization and/or pyrolysis products may be produced from the formation through production wells. In some embodiments, the average temperature of one or more sections is raised to mobilization temperatures and hydrocarbons are produced from the production wells. The average temperature of one or more of the sections may be raised to pyrolysis temperatures after production due to mobilization decreases below a selected value. In some embodiments, the average temperature of one or more sections may be raised to pyrolysis temperatures without significant production before reaching pyrolysis temperatures. Formation fluids including pyrolysis products may be produced through the production wells.

In some embodiments, the average temperature of one or more sections may be raised to temperatures sufficient to allow synthesis gas production after mobilization and/or pyrolysis. In some embodiments, hydrocarbons may be raised to temperatures sufficient to allow synthesis gas production without significant production before reaching the temperatures sufficient to allow synthesis gas production. For example, synthesis gas may be produced in a temperature range from about 400° C. to about 1200° C., about 500° C. to about 1100° C., or about 550° C. to about 1000° C. A synthesis gas generating fluid (for example, steam and/or water) may be introduced into the sections to generate synthesis gas. Synthesis gas may be produced from production wells.

Solution mining, removal of volatile hydrocarbons and water, mobilizing hydrocarbons, pyrolyzing hydrocarbons, generating synthesis gas, and/or other processes may be performed during the in situ heat treatment process. In some embodiments, some processes may be performed after the in situ heat treatment process. Such processes may include, but are not limited to, recovering heat from treated sections, storing fluids (for example, water and/or hydrocarbons) in previously treated sections, and/or sequestering carbon dioxide in previously treated sections.

FIG. 1 depicts a schematic view of an embodiment of a portion of the in situ heat treatment system for treating the hydrocarbon containing formation. The in situ heat treatment system may include barrier wells 200. Barrier wells are used to form a barrier around a treatment area. The barrier inhibits fluid flow into and/or out of the treatment area. Barrier wells include, but are not limited to, dewatering wells, vacuum wells, capture wells, injection wells, grout wells, freeze wells, or combinations thereof. In some embodiments, barrier wells 200 are dewatering wells. Dewatering wells may remove liquid water and/or inhibit liquid water from entering a portion of the formation to be heated, or to the formation being heated. In the embodiment depicted in FIG. 1, the barrier wells 200 are shown extending only along one side of heat sources 202, but the barrier wells typically encircle all heat sources 202 used, or to be used, to heat a treatment area of the formation.

Heat sources 202 are placed in at least a portion of the formation. Heat sources 202 may include heaters such as insulated conductors, conductor-in-conduit heaters, surface burners, flameless distributed combustors, and/or natural distributed combustors. Heat sources 202 may also include other types of heaters. Heat sources 202 provide heat to at least a portion of the formation to heat hydrocarbons in the formation. Energy may be supplied to heat sources 202 through supply lines 204. Supply lines 204 may be structurally different depending on the type of heat source or heat sources used to heat the formation. Supply lines 204 for heat sources may transmit electricity for electric heaters, may transport fuel for combustors, or may transport heat exchange fluid that is circulated in the formation. In some embodiments, electricity for an in situ heat treatment process may be provided by a nuclear power plant or nuclear power plants. The use of nuclear power may allow for reduction or elimination of carbon dioxide emissions from the in situ heat treatment process.

When the formation is heated, the heat input into the formation may cause expansion of the formation and geomechanical motion. The heat sources may be turned on before, at the same time, or during a dewatering process. Computer simulations may model formation response to heating. The computer simulations may be used to develop a pattern and time sequence for activating heat sources in the formation so that geomechanical motion of the formation does not adversely affect the functionality of heat sources, production wells, and other equipment in the formation.

Heating the formation may cause an increase in permeability and/or porosity of the formation. Increases in permeability and/or porosity may result from a reduction of mass in the formation due to vaporization and removal of water, removal of hydrocarbons, and/or creation of fractures. Fluid may flow more easily in the heated portion of the formation because of the increased permeability and/or porosity of the formation. Fluid in the heated portion of the formation may move a considerable distance through the formation because of the increased permeability and/or porosity. The considerable distance may be over 1000 m depending on various factors, such as permeability of the formation, properties of the fluid, temperature of the formation, and pressure gradient allowing movement of the fluid. The ability of fluid to travel considerable distance in the formation allows production wells 206 to be spaced relatively far apart in the formation.

Production wells 206 are used to remove formation fluid from the formation. In some embodiments, production well 206 includes a heat source. The heat source in the production well may heat one or more portions of the formation at or near the production well. In some in situ heat treatment process embodiments, the amount of heat supplied to the formation from the production well per meter of the production well is less than the amount of heat applied to the formation from a heat source that heats the formation per meter of the heat source. Heat applied to the formation from the production well may increase formation permeability adjacent to the production well by vaporizing and removing liquid phase fluid adjacent to the production well and/or by increasing the permeability of the formation adjacent to the production well by formation of macro and/or micro fractures.

More than one heat source may be positioned in the production well. A heat source in a lower portion of the production well may be turned off when superposition of heat from adjacent heat sources heats the formation sufficiently to counteract benefits provided by heating the formation with the production well. In some embodiments, the heat source in an upper portion of the production well may remain on after the heat source in the lower portion of the production well is deactivated. The heat source in the upper portion of the well may inhibit condensation and reflux of formation fluid.

In some embodiments, the heat source in production well 206 allows for vapor phase removal of formation fluids from the formation. Providing heating at or through the production well may: (1) inhibit condensation and/or refluxing of production fluid when such production fluid is moving in the production well proximate the overburden, (2) increase heat input into the formation, (3) increase production rate from the production well as compared to a production well without a heat source, (4) inhibit condensation of high carbon number compounds (C6 hydrocarbons and above) in the production well, and/or (5) increase formation permeability at or proximate the production well.

Subsurface pressure in the formation may correspond to the fluid pressure generated in the formation. As temperatures in the heated portion of the formation increase, the pressure in the heated portion may increase as a result of thermal expansion of in situ fluids, increased fluid generation and vaporization of water. Controlling rate of fluid removal from the formation may allow for control of pressure in the formation. Pressure in the formation may be determined at a number of different locations, such as near or at production wells, near or at heat sources, or at monitor wells.

In some hydrocarbon containing formations, production of hydrocarbons from the formation is inhibited until at least some hydrocarbons in the formation have been mobilized and/or pyrolyzed. Formation fluid may be produced from the formation when the formation fluid is of a selected quality. In some embodiments, the selected quality includes an API gravity of at least about 20°, 30°, or 40°. Inhibiting production until at least some hydrocarbons are mobilized and/or pyrolyzed may increase conversion of heavy hydrocarbons to light hydrocarbons. Inhibiting initial production may minimize the production of heavy hydrocarbons from the formation. Production of substantial amounts of heavy hydrocarbons may require expensive equipment and/or reduce the life of production equipment.

In some hydrocarbon containing formations, hydrocarbons in the formation may be heated to mobilization and/or pyrolysis temperatures before substantial permeability has been generated in the heated portion of the formation. An initial lack of permeability may inhibit the transport of generated fluids to production wells 206. During initial heating, fluid pressure in the formation may increase proximate heat sources 202. The increased fluid pressure may be released, monitored, altered, and/or controlled through one or more heat sources 202. For example, selected heat sources 202 or separate pressure relief wells may include pressure relief valves that allow for removal of some fluid from the formation.

In some embodiments, pressure generated by expansion of mobilized fluids, pyrolysis fluids or other fluids generated in the formation may be allowed to increase although an open path to production wells 206 or any other pressure sink may not yet exist in the formation. The fluid pressure may be allowed to increase towards a lithostatic pressure. Fractures in the hydrocarbon containing formation may form when the fluid approaches the lithostatic pressure. For example, fractures may form from heat sources 202 to production wells 206 in the heated portion of the formation. The generation of fractures in the heated portion may relieve some of the pressure in the portion. Pressure in the formation may have to be maintained below a selected pressure to inhibit unwanted production, fracturing of the overburden or underburden, and/or coking of hydrocarbons in the formation.

After mobilization and/or pyrolysis temperatures are reached and production from the formation is allowed, pressure in the formation may be varied to alter and/or control a composition of formation fluid produced, to control a percentage of condensable fluid as compared to non-condensable fluid in the formation fluid, and/or to control an API gravity of formation fluid being produced. For example, decreasing pressure may result in production of a larger condensable fluid component. The condensable fluid component may contain a larger percentage of olefins.

In some in situ heat treatment process embodiments, pressure in the formation may be maintained high enough to promote production of formation fluid with an API gravity of greater than 20°. Maintaining increased pressure in the formation may inhibit formation subsidence during in situ heat treatment. Maintaining increased pressure may reduce or eliminate the need to compress formation fluids at the surface to transport the fluids in collection conduits to treatment facilities.

Maintaining increased pressure in a heated portion of the formation may surprisingly allow for production of large quantities of hydrocarbons of increased quality and of relatively low molecular weight. Pressure may be maintained so that formation fluid produced has a minimal amount of compounds above a selected carbon number. The selected carbon number may be at most 25, at most 20, at most 12, or at most 8. Some high carbon number compounds may be entrained in vapor in the formation and may be removed from the formation with the vapor. Maintaining increased pressure in the formation may inhibit entrainment of high carbon number compounds and/or multi-ring hydrocarbon compounds in the vapor. High carbon number compounds and/or multi-ring hydrocarbon compounds may remain in a liquid phase in the formation for significant time periods. The significant time periods may provide sufficient time for the compounds to pyrolyze to form lower carbon number compounds.

Generation of relatively low molecular weight hydrocarbons is believed to be due, in part, to autogenous generation and reaction of hydrogen in a portion of the hydrocarbon containing formation. For example, maintaining an increased pressure may force hydrogen generated during pyrolysis into the liquid phase within the formation. Heating the portion to a temperature in a pyrolysis temperature range may pyrolyze hydrocarbons in the formation to generate liquid phase pyrolyzation fluids. The generated liquid phase pyrolyzation fluids components may include double bonds and/or radicals. Hydrogen ($H_2$) in the liquid phase may reduce double bonds of the generated pyrolyzation fluids, thereby reducing a potential for polymerization or formation of long chain compounds from the generated pyrolyzation fluids. In addition, $H_2$ may also neutralize radicals in the generated pyrolyzation fluids. $H_2$ in the liquid phase may inhibit the generated pyrolyzation fluids from reacting with each other and/or with other compounds in the formation.

Formation fluid produced from production wells 206 may be transported through collection piping 208 to treatment facilities 210. Formation fluids may also be produced from heat sources 202. For example, fluid may be produced from heat sources 202 to control pressure in the formation adjacent to the heat sources. Fluid produced from heat sources 202 may be transported through tubing or piping to collection piping 208 or the produced fluid may be transported through tubing or piping directly to treatment facilities 210. Treatment facilities 210 may include separation units, reaction units, upgrading units, fuel cells, turbines, storage vessels, and/or other systems and units for processing produced formation fluids. The treatment facilities may form transportation fuel from at least a portion of the hydrocarbons produced from the formation. In some embodiments, the transportation fuel may be jet fuel, such as JP-8.

An insulated conductor may be used as an electric heater element of a heater or a heat source. The insulated conductor may include an inner electrical conductor (core) surrounded by an electrical insulator and an outer electrical conductor (jacket). The electrical insulator may include mineral insulation (for example, magnesium oxide) or other electrical insulation.

In certain embodiments, the insulated conductor is placed in an opening in a hydrocarbon containing formation. In some embodiments, the insulated conductor is placed in an uncased opening in the hydrocarbon containing formation. Placing the insulated conductor in an uncased opening in the hydrocarbon containing formation may allow heat transfer from the insulated conductor to the formation by radiation as well as conduction. Using an uncased opening may facilitate retrieval of the insulated conductor from the well, if necessary.

In some embodiments, an insulated conductor is placed within a casing in the formation; may be cemented within the formation; or may be packed in an opening with sand, gravel, or other fill material. The insulated conductor may be supported on a support member positioned within the opening. The support member may be a cable, rod, or a conduit (for example, a pipe). The support member may be made of a metal, ceramic, inorganic material, or combinations thereof. Because portions of a support member may be exposed to formation fluids and heat during use, the support member may be chemically resistant and/or thermally resistant.

Ties, spot welds, and/or other types of connectors may be used to couple the insulated conductor to the support member at various locations along a length of the insulated conductor. The support member may be attached to a wellhead at an upper surface of the formation. In some embodiments, the insulated conductor has sufficient structural strength such that a support member is not needed. The insulated conductor may, in many instances, have at least some flexibility to inhibit thermal expansion damage when undergoing temperature changes.

In certain embodiments, insulated conductors are placed in wellbores without support members and/or centralizers. An insulated conductor without support members and/or centralizers may have a suitable combination of temperature and corrosion resistance, creep strength, length, thickness (diameter), and metallurgy that will inhibit failure of the insulated conductor during use.

Figure 2:
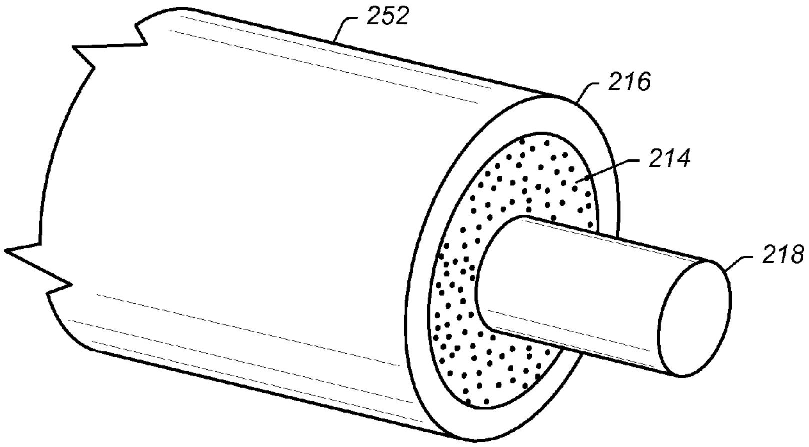
FIG. 2 depicts an embodiment of an insulated conductor heat source.

FIG. 2 depicts a perspective view of an end portion of an embodiment of insulated conductor 252. Insulated conductor 252 may have any desired cross-sectional shape such as, but not limited to, round (depicted in FIG. 2), triangular, ellipsoidal, rectangular, hexagonal, or irregular. In certain embodiments, insulated conductor 252 includes core 218, electrical insulator 214, and jacket 216. Core 218 may resistively heat when an electrical current passes through the core. Alternating or time-varying current and/or direct current may be used to provide power to core 218 such that the core resistively heats.

In some embodiments, electrical insulator 214 inhibits current leakage and arcing to jacket 216. Electrical insulator 214 may thermally conduct heat generated in core 218 to jacket 216. Jacket 216 may radiate or conduct heat to the formation. In certain embodiments, insulated conductor 252 is 1000 m or more in length. Longer or shorter insulated conductors may also be used to meet specific application needs. The dimensions of core 218, electrical insulator 214, and jacket 216 of insulated conductor 252 may be selected such that the insulated conductor has enough strength to be self supporting even at upper working temperature limits. Such insulated conductors may be suspended from wellheads or supports positioned near an interface between an overburden and a hydrocarbon containing formation without the need for support members extending into the hydrocarbon containing formation along with the insulated conductors.

Insulated conductor 252 may be designed to operate at power levels of up to about 1650 watts/meter or higher. In certain embodiments, insulated conductor 252 operates at a power level between about 300 watts/meter and about 1150 watts/meter when heating a formation. Insulated conductor 252 may be designed so that a maximum voltage level at a typical operating temperature does not cause substantial thermal and/or electrical breakdown of electrical insulator 214. Insulated conductor 252 may be designed such that jacket 216 does not exceed a temperature that will result in a significant reduction in corrosion resistance properties of the jacket material. In certain embodiments, insulated conductor 252 may be designed to reach temperatures within a range between about 650° C. and about 900° C. Insulated conductors having other operating ranges may be formed to meet specific operational requirements.

FIG. 2 depicts insulated conductor 252 having a single core 218. In some embodiments, insulated conductor 252 has two or more cores 218. For example, a single insulated conductor may have three cores. Core 218 may be made of metal or another electrically conductive material. The material used to form core 218 may include, but not be limited to, nichrome, copper, nickel, carbon steel, stainless steel, and combinations thereof. In certain embodiments, core 218 is chosen to have a diameter and a resistivity at operating temperatures such that its resistance, as derived from Ohm's law, makes it electrically and structurally stable for the chosen power dissipation per meter, the length of the heater, and/or the maximum voltage allowed for the core material.

In some embodiments, core 218 is made of different materials along a length of insulated conductor 252. For example, a first section of core 218 may be made of a material that has a significantly lower resistance than a second section of the core. The first section may be placed adjacent to a formation layer that does not need to be heated to as high a temperature as a second formation layer that is adjacent to the second section. The resistivity of various sections of core 218 may be adjusted by having a variable diameter and/or by having core sections made of different materials.

Electrical insulator 214 may be made of a variety of materials. Commonly used powders may include, but are not limited to, MgO, $Al_2O_3$, Zirconia, BeO, different chemical variations of Spinels, and combinations thereof. MgO may provide good thermal conductivity and electrical insulation properties. The desired electrical insulation properties include low leakage current and high dielectric strength. A low leakage current decreases the possibility of thermal breakdown and the high dielectric strength decreases the possibility of arcing across the insulator. Thermal breakdown can occur if the leakage current causes a progressive rise in the temperature of the insulator leading also to arcing across the insulator.

Jacket 216 may be an outer metallic layer or electrically conductive layer. Jacket 216 may be in contact with hot formation fluids. Jacket 216 may be made of material having a high resistance to corrosion at elevated temperatures. Alloys that may be used in a desired operating temperature range of jacket 216 include, but are not limited to, 304 stainless steel, 310 stainless steel, Incoloy® 800, and Inconel® 600 (Inco Alloys International, Huntington, W. Va., U.S.A.). The thickness of jacket 216 may have to be sufficient to last for three to ten years in a hot and corrosive environment. A thickness of jacket 216 may generally vary between about 1 mm and about 3.5 mm. For example, a 1.3 mm thick, 310 stainless steel outer layer may be used as jacket 216 to provide good chemical resistance to sulfidation corrosion in a heated zone of a formation for a period of over 3 years. Larger or smaller jacket thicknesses may be used to meet specific application requirements.

One or more insulated conductors may be placed within an opening in a formation to form a heat source or heat sources. Electrical current may be passed through each insulated conductor in the opening to heat the formation. Alternately, electrical current may be passed through selected insulated conductors in an opening. The unused conductors may be used as backup heaters. Insulated conductors may be electrically coupled to a power source in any convenient manner. Each end of an insulated conductor may be coupled to lead-in cables that pass through a wellhead. Such a configuration typically has a 180° bend (a "hairpin" bend) or turn located near a bottom of the heat source. An insulated conductor that includes a 180° bend or turn may not require a bottom termination, but the 180° bend or turn may be an electrical and/or structural weakness in the heater. Insulated conductors may be electrically coupled together in series, in parallel, or in series and parallel combinations. In some embodiments of heat sources, electrical current may pass into the conductor of an insulated conductor and may be returned through the jacket of the insulated conductor by connecting core 218 to jacket 216 (shown in FIG. 2) at the bottom of the heat source.

Figure 3:
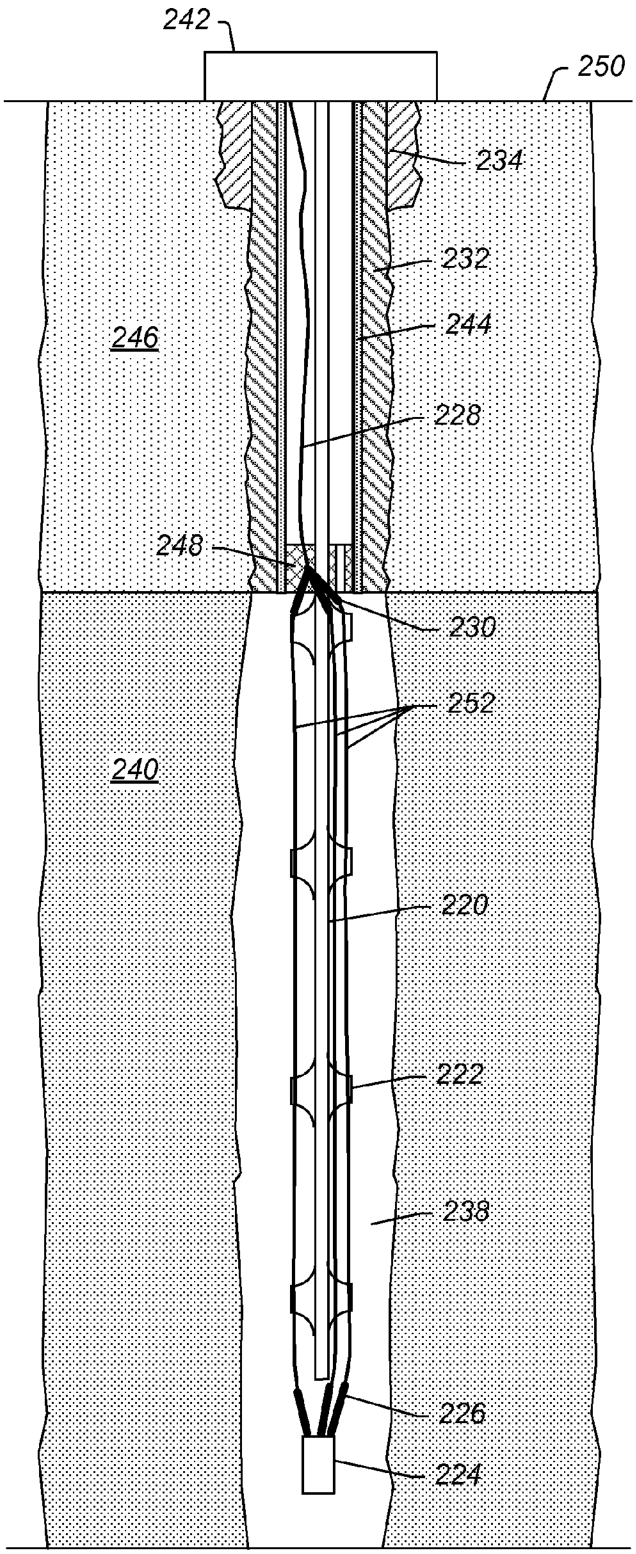
FIG. 3 depicts an embodiment of an insulated conductor heat source.
Figure 4:
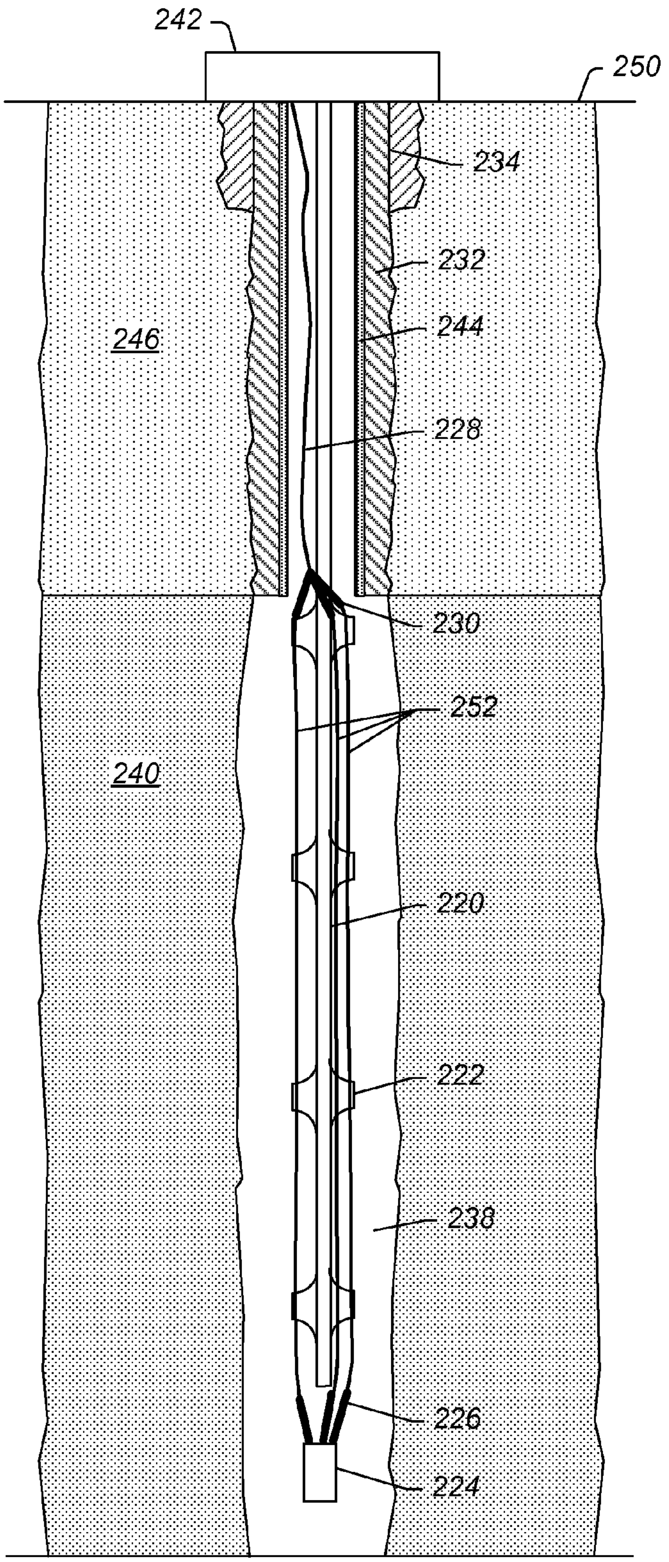
FIG. 4 depicts an embodiment of an insulated conductor heat source.

In some embodiments, three insulated conductors 252 are electrically coupled in a 3-phase wye configuration to a power supply. FIG. 3 depicts an embodiment of three insulated conductors in an opening in a subsurface formation coupled in a wye configuration. FIG. 4 depicts an embodiment of three insulated conductors 252 that are removable from opening 238 in the formation. No bottom connection may be required for three insulated conductors in a wye configuration. Alternately, all three insulated conductors of the wye configuration may be connected together near the bottom of the opening. The connection may be made directly at ends of heating sections of the insulated conductors or at ends of cold pins (less resistive sections) coupled to the heating sections at the bottom of the insulated conductors. The bottom connections may be made with insulator filled and sealed canisters or with epoxy filled canisters. The insulator may be the same composition as the insulator used as the electrical insulation.

Three insulated conductors 252 depicted in FIGS. 3 and 4 may be coupled to support member 220 using centralizers 222. Alternatively, insulated conductors 252 may be strapped directly to support member 220 using metal straps. Centralizers 222 may maintain a location and/or inhibit movement of insulated conductors 252 on support member 220. Centralizers 222 may be made of metal, ceramic, or combinations thereof. The metal may be stainless steel or any other type of metal able to withstand a corrosive and high temperature environment. In some embodiments, centralizers 222 are bowed metal strips welded to the support member at distances less than about 6 m. A ceramic used in centralizer 222 may be, but is not limited to, $Al_2O_3$, MgO, or another electrical insulator. Centralizers 222 may maintain a location of insulated conductors 252 on support member 220 such that movement of insulated conductors is inhibited at operating temperatures of the insulated conductors. Insulated conductors 252 may also be somewhat flexible to withstand expansion of support member 220 during heating.

Support member 220, insulated conductor 252, and centralizers 222 may be placed in opening 238 in hydrocarbon layer 240. Insulated conductors 252 may be coupled to bottom conductor junction 224 using cold pin 226. Bottom conductor junction 224 may electrically couple each insulated conductor 252 to each other. Bottom conductor junction 224 may include materials that are electrically conducting and do not melt at temperatures found in opening 238. Cold pin 226 may be an insulated conductor having lower electrical resistance than insulated conductor 252.

Lead-in conductor 228 may be coupled to wellhead 242 to provide electrical power to insulated conductor 252. Lead-in conductor 228 may be made of a relatively low electrical resistance conductor such that relatively little heat is generated from electrical current passing through the lead-in conductor. In some embodiments, the lead-in conductor is a rubber or polymer insulated stranded copper wire. In some embodiments, the lead-in conductor is a mineral insulated conductor with a copper core. Lead-in conductor 228 may couple to wellhead 242 at surface 250 through a sealing flange located between overburden 246 and surface 250. The sealing flange may inhibit fluid from escaping from opening 238 to surface 250.

In certain embodiments, lead-in conductor 228 is coupled to insulated conductor 252 using transition conductor 230. Transition conductor 230 may be a less resistive portion of insulated conductor 252. Transition conductor 230 may be referred to as "cold pin" of insulated conductor 252. Transition conductor 230 may be designed to dissipate about one-tenth to about one-fifth of the power per unit length as is dissipated in a unit length of the primary heating section of insulated conductor 252. Transition conductor 230 may typically be between about 1.5 m and about 15 m, although shorter or longer lengths may be used to accommodate specific application needs. In an embodiment, the conductor of transition conductor 230 is copper. The electrical insulator of transition conductor 230 may be the same type of electrical insulator used in the primary heating section. A jacket of transition conductor 230 may be made of corrosion resistant material.

In certain embodiments, transition conductor 230 is coupled to lead-in conductor 228 by a splice or other coupling joint. Splices may also be used to couple transition conductor 230 to insulated conductor 252. Splices may have to withstand temperatures approaching that of a target zone operating temperature (for example, a temperature equal to half of a target zone operating temperature), depending on the number of conductors in the opening and whether the splices are staggered. Density of electrical insulation in the splice should in many instances be high enough to withstand the required temperature and the operating voltage.

In some embodiments, as shown in FIG. 3, packing material 248 is placed between overburden casing 244 and opening 238. In some embodiments, reinforcing material 232 may secure overburden casing 244 to overburden 246. Packing material 248 may inhibit fluid from flowing from opening 238 to surface 250. Reinforcing material 232 may include, for example, Class G or Class H Portland cement mixed with silica flour for improved high temperature performance, slag or silica flour, and/or a mixture thereof. In some embodiments, reinforcing material 232 extends radially a width of from about 5 cm to about 25 cm.

As shown in FIGS. 3 and 4, support member 220 and lead-in conductor 228 may be coupled to wellhead 242 at surface 250 of the formation. Surface conductor 234 may enclose reinforcing material 232 and couple to wellhead 242. Embodiments of surface conductors may extend to depths of approximately 3 m to approximately 515 m into an opening in the formation. Alternatively, the surface conductor may extend to a depth of approximately 9 m into the formation. Electrical current may be supplied from a power source to insulated conductor 252 to generate heat due to the electrical resistance of the insulated conductor. Heat generated from three insulated conductors 252 may transfer within opening 238 to heat at least a portion of hydrocarbon layer 240.

Heat generated by insulated conductors 252 may heat at least a portion of a hydrocarbon containing formation. In some embodiments, heat is transferred to the formation substantially by radiation of the generated heat to the formation. Some heat may be transferred by conduction or convection of heat due to gases present in the opening. The opening may be an uncased opening, as shown in FIGS. 3 and 4. An uncased opening eliminates cost associated with thermally cementing the heater to the formation, costs associated with a casing, and/or costs of packing a heater within an opening. In addition, heat transfer by radiation is typically more efficient than by conduction, so the heaters may be operated at lower temperatures in an open wellbore. Conductive heat transfer during initial operation of a heat source may be enhanced by the addition of a gas in the opening. The gas may be maintained at a pressure up to about 27 bars absolute. The gas may include, but is not limited to, carbon dioxide and/or helium. An insulated conductor heater in an open wellbore may advantageously be free to expand or contract to accommodate thermal expansion and contraction. An insulated conductor heater may advantageously be removable or redeployable from an open wellbore.

In certain embodiments, an insulated conductor heater assembly is installed or removed using a spooling assembly. More than one spooling assembly may be used to install both the insulated conductor and a support member simultaneously. Alternatively, the support member may be installed using a coiled tubing unit. The heaters may be un-spooled and connected to the support as the support is inserted into the well. The electric heater and the support member may be un-spooled from the spooling assemblies. Spacers may be coupled to the support member and the heater along a length of the support member. Additional spooling assemblies may be used for additional electric heater elements.

Temperature limited heaters may be in configurations and/or may include materials that provide automatic temperature limiting properties for the heater at certain temperatures. In certain embodiments, ferromagnetic materials are used in temperature limited heaters. Ferromagnetic material may self-limit temperature at or near the Curie temperature of the material and/or the phase transformation temperature range to provide a reduced amount of heat when a time-varying current is applied to the material. In certain embodiments, the ferromagnetic material self-limits temperature of the temperature limited heater at a selected temperature that is approximately the Curie temperature and/or in the phase transformation temperature range. In certain embodiments, the selected temperature is within about 35° C., within about 25° C., within about 20° C., or within about 10° C. of the Curie temperature and/or the phase transformation temperature range. In certain embodiments, ferromagnetic materials are coupled with other materials (for example, highly conductive materials, high strength materials, corrosion resistant materials, or combinations thereof) to provide various electrical and/or mechanical properties. Some parts of the temperature limited heater may have a lower resistance (caused by different geometries and/or by using different ferromagnetic and/or non-ferromagnetic materials) than other parts of the temperature limited heater. Having parts of the temperature limited heater with various materials and/or dimensions allows for tailoring the desired heat output from each part of the heater.

Temperature limited heaters may be more reliable than other heaters. Temperature limited heaters may be less apt to break down or fail due to hot spots in the formation. In some embodiments, temperature limited heaters allow for substantially uniform heating of the formation. In some embodiments, temperature limited heaters are able to heat the formation more efficiently by operating at a higher average heat output along the entire length of the heater. The temperature limited heater operates at the higher average heat output along the entire length of the heater because power to the heater does not have to be reduced to the entire heater, as is the case with typical constant wattage heaters, if a temperature along any point of the heater exceeds, or is about to exceed, a maximum operating temperature of the heater. Heat output from portions of a temperature limited heater approaching a Curie temperature and/or the phase transformation temperature range of the heater automatically reduces without controlled adjustment of the time-varying current applied to the heater. The heat output automatically reduces due to changes in electrical properties (for example, electrical resistance) of portions of the temperature limited heater. Thus, more power is supplied by the temperature limited heater during a greater portion of a heating process.

In certain embodiments, the system including temperature limited heaters initially provides a first heat output and then provides a reduced (second heat output) heat output, near, at, or above the Curie temperature and/or the phase transformation temperature range of an electrically resistive portion of the heater when the temperature limited heater is energized by a time-varying current. The first heat output is the heat output at temperatures below which the temperature limited heater begins to self-limit. In some embodiments, the first heat output is the heat output at a temperature about 50° C., about 75° C., about 100° C., or about 125° C. below the Curie temperature and/or the phase transformation temperature range of the ferromagnetic material in the temperature limited heater.

The temperature limited heater may be energized by time-varying current (alternating current or modulated direct current) supplied at the wellhead. The wellhead may include a power source and other components (for example, modulation components, transformers, and/or capacitors) used in supplying power to the temperature limited heater. The temperature limited heater may be one of many heaters used to heat a portion of the formation.

In some embodiments, a relatively thin conductive layer is used to provide the majority of the electrically resistive heat output of the temperature limited heater at temperatures up to a temperature at or near the Curie temperature and/or the phase transformation temperature range of the ferromagnetic conductor. Such a temperature limited heater may be used as the heating member in an insulated conductor heater. The heating member of the insulated conductor heater may be located inside a sheath with an insulation layer between the sheath and the heating member.

Figure 5B:
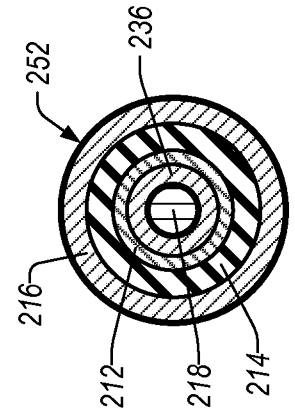
FIGS. 5A and 5B depict cross-sectional representations of an embodiment of a temperature limited heater component used in an insulated conductor heater.
Figure 5A:
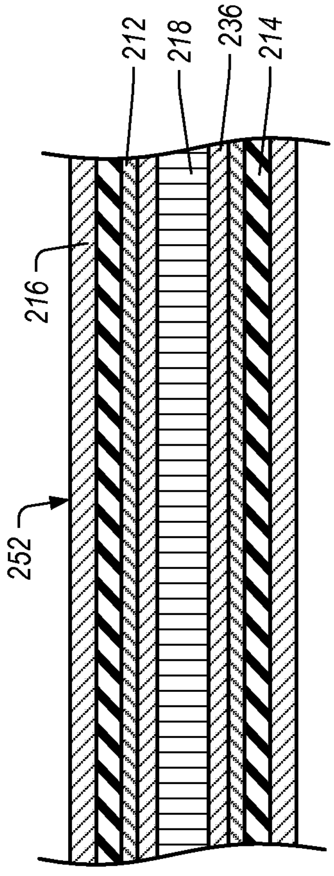

FIGS. 5A and 5B depict cross-sectional representations of an embodiment of the insulated conductor heater with the temperature limited heater as the heating member. Insulated conductor 252 includes core 218, ferromagnetic conductor 236, inner conductor 212, electrical insulator 214, and jacket 216. Core 218 is a copper core. Ferromagnetic conductor 236 is, for example, iron or an iron alloy.

Inner conductor 212 is a relatively thin conductive layer of non-ferromagnetic material with a higher electrical conductivity than ferromagnetic conductor 236. In certain embodiments, inner conductor 212 is copper. Inner conductor 212 may be a copper alloy. Copper alloys typically have a flatter resistance versus temperature profile than pure copper. A flatter resistance versus temperature profile may provide less variation in the heat output as a function of temperature up to the Curie temperature and/or the phase transformation temperature range. In some embodiments, inner conductor 212 is copper with 6% by weight nickel (for example, $CuNi_6$ or LOHM™). In some embodiments, inner conductor 212 is $CuNi_{10}Fe_1Mn$ alloy. Below the Curie temperature and/or the phase transformation temperature range of ferromagnetic conductor 236, the magnetic properties of the ferromagnetic conductor confine the majority of the flow of electrical current to inner conductor 212. Thus, inner conductor 212 provides the majority of the resistive heat output of insulated conductor 252 below the Curie temperature and/or the phase transformation temperature range.

In certain embodiments, inner conductor 212 is dimensioned, along with core 218 and ferromagnetic conductor 236, so that the inner conductor provides a desired amount of heat output and a desired turndown ratio. For example, inner conductor 212 may have a cross-sectional area that is around 2 or 3 times less than the cross-sectional area of core 218. Typically, inner conductor 212 has to have a relatively small cross-sectional area to provide a desired heat output if the inner conductor is copper or copper alloy. In an embodiment with copper inner conductor 212, core 218 has a diameter of 0.66 cm, ferromagnetic conductor 236 has an outside diameter of 0.91 cm, inner conductor 212 has an outside diameter of 1.03 cm, electrical insulator 214 has an outside diameter of 1.53 cm, and jacket 216 has an outside diameter of 1.79 cm. In an embodiment with a CuNi6 inner conductor 212, core 218 has a diameter of 0.66 cm, ferromagnetic conductor 236 has an outside diameter of 0.91 cm, inner conductor 212 has an outside diameter of 1.12 cm, electrical insulator 214 has an outside diameter of 1.63 cm, and jacket 216 has an outside diameter of 1.88 cm. Such insulated conductors are typically smaller and cheaper to manufacture than insulated conductors that do not use the thin inner conductor to provide the majority of heat output below the Curie temperature and/or the phase transformation temperature range.

Electrical insulator 214 may be magnesium oxide, aluminum oxide, silicon dioxide, beryllium oxide, boron nitride, silicon nitride, or combinations thereof. In certain embodiments, electrical insulator 214 is a compacted powder of magnesium oxide. In some embodiments, electrical insulator 214 includes beads of silicon nitride.

In certain embodiments, a small layer of material is placed between electrical insulator 214 and inner conductor 212 to inhibit copper from migrating into the electrical insulator at higher temperatures. For example, a small layer of nickel (for example, about 0.5 mm of nickel) may be placed between electrical insulator 214 and inner conductor 212.

Jacket 216 is made of a corrosion resistant material such as, but not limited to, 347 stainless steel, 347H stainless steel, 446 stainless steel, or 825 stainless steel. In some embodiments, jacket 216 provides some mechanical strength for insulated conductor 252 at or above the Curie temperature and/or the phase transformation temperature range of ferromagnetic conductor 236. In certain embodiments, jacket 216 is not used to conduct electrical current.

There are many potential problems in making insulated conductors in relatively long lengths (for example, lengths of 10 m or longer). For example, gaps may exist between blocks of material used to form the electrical insulator in the insulated conductor. These gaps may lead to bulges or mechanical defects in the core or other components of the insulated conductor. Insulated conductors include insulated conductor used as heaters and/or insulated conductors used in the overburden section of the formation (insulated conductors that provide little or no heat output). Insulated conductors may be, for example, mineral insulated conductors such as mineral insulated cables.

In a typical process used to make (form) an insulated conductor, the jacket of the insulated conductor starts as a strip of electrically conducting material (for example, stainless steel). The jacket strip is formed (longitudinally rolled) into a partial cylindrical shape and electrical insulator blocks (for example, magnesium oxide blocks) are inserted into the partially cylindrical jacket. The inserted blocks may be partial cylinder blocks such as half-cylinder blocks. Following insertion of the blocks, the longitudinal core, which is typically a solid cylinder, is placed in the partial cylinder and inside the half-cylinder blocks. The core is made of electrically conducting material such as copper, nickel, and/or steel.

Once the electrical insulator blocks and the core are in place, the portion of the jacket containing the blocks and the core may be formed into a complete cylinder around the blocks and the core. The longitudinal edges of the jacket that close the cylinder may be welded to form an insulated conductor assembly with the core and electrical insulator blocks inside the jacket. The process of inserting the blocks and closing the jacket cylinder may be repeated along a length of jacket to form the insulated conductor assembly in a desired length.

As the insulated conductor assembly is formed, further steps may be taken to reduce gaps in the assembly. For example, the insulated conductor assembly may be moved through a progressive reduction system to reduce gaps in the assembly. One example of a progressive reduction system is a roller system. In the roller system, the insulated conductor assembly may progress through multiple horizontal and vertical rollers with the assembly alternating between horizontal and vertical rollers. The rollers may progressively reduce the size of the insulated conductor assembly into the final, desired outside diameter.

If the electrical insulator blocks are allowed to freely sit in the jacket during the insulated conductor assembly reduction process, one or more of the blocks may have gaps between them that allow problems such as core bulge or other mechanical defects to occur in the reduced insulated conductor assembly. Such occurrences may lead to electrical problems during use of the insulated conductor assembly and may potentially render the assembly inoperable for its intended purpose. Thus, a reliable method is needed to ensure that gaps between the electrical insulator blocks are reduced or eliminated during the insulated conductor assembly reduction process.

In certain embodiments, an axial force is placed on the blocks inside the insulated conductor assembly to minimize gaps between the blocks. For example, as one or more blocks are inserted in the insulated conductor assembly, the inserted blocks may be pushed (either mechanically or pneumatically) axially along the assembly against blocks already in the assembly. Pushing the inserted blocks against the blocks already in the insulated conductor assembly with a sufficient force minimizes gaps between blocks by providing and maintaining a force between blocks along the length of the assembly as the assembly is moved through the assembly reduction process.

Figure 6:
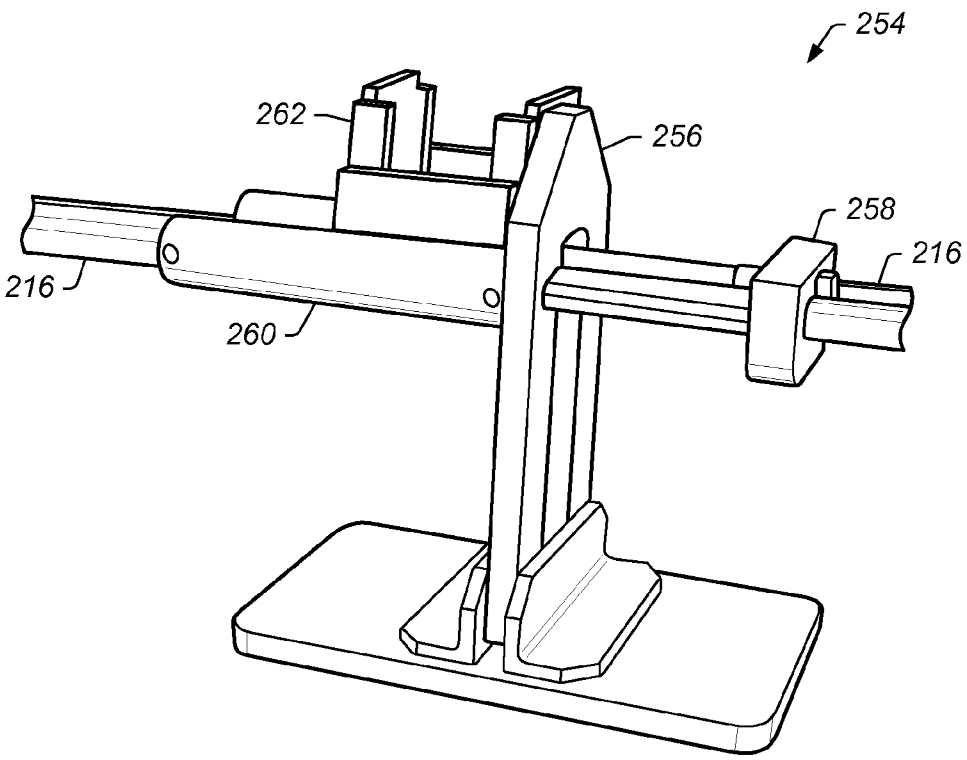
FIGS. 6-8 depict an embodiment of a block pushing device that may be used to provide axial force to blocks in a heater assembly.
Figure 7:
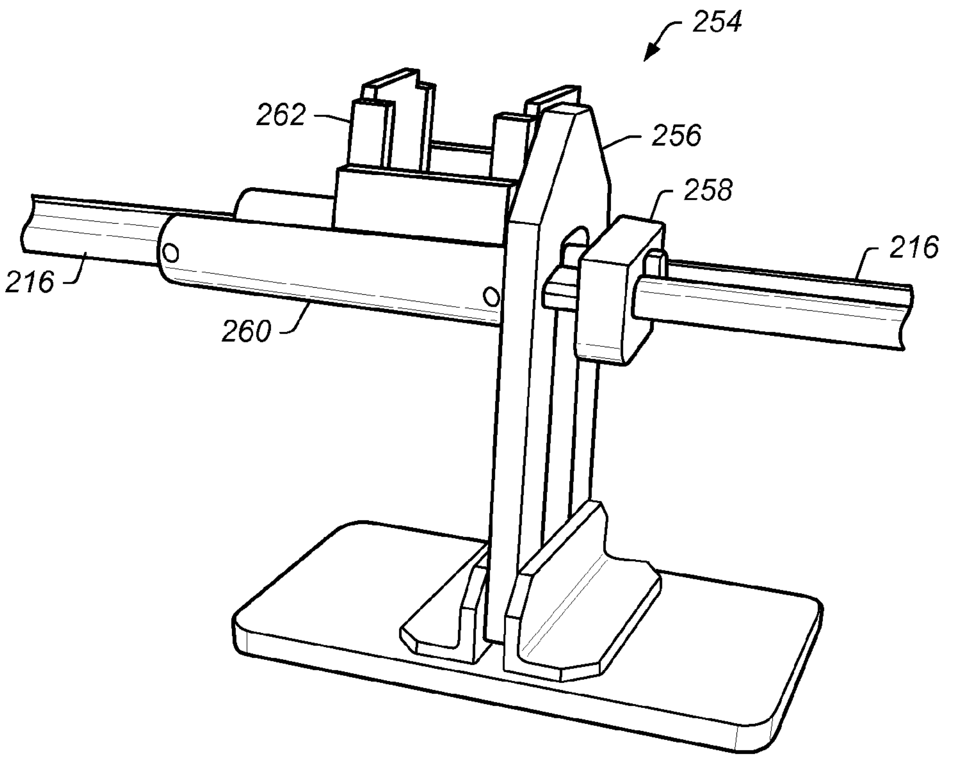
Figure 8:
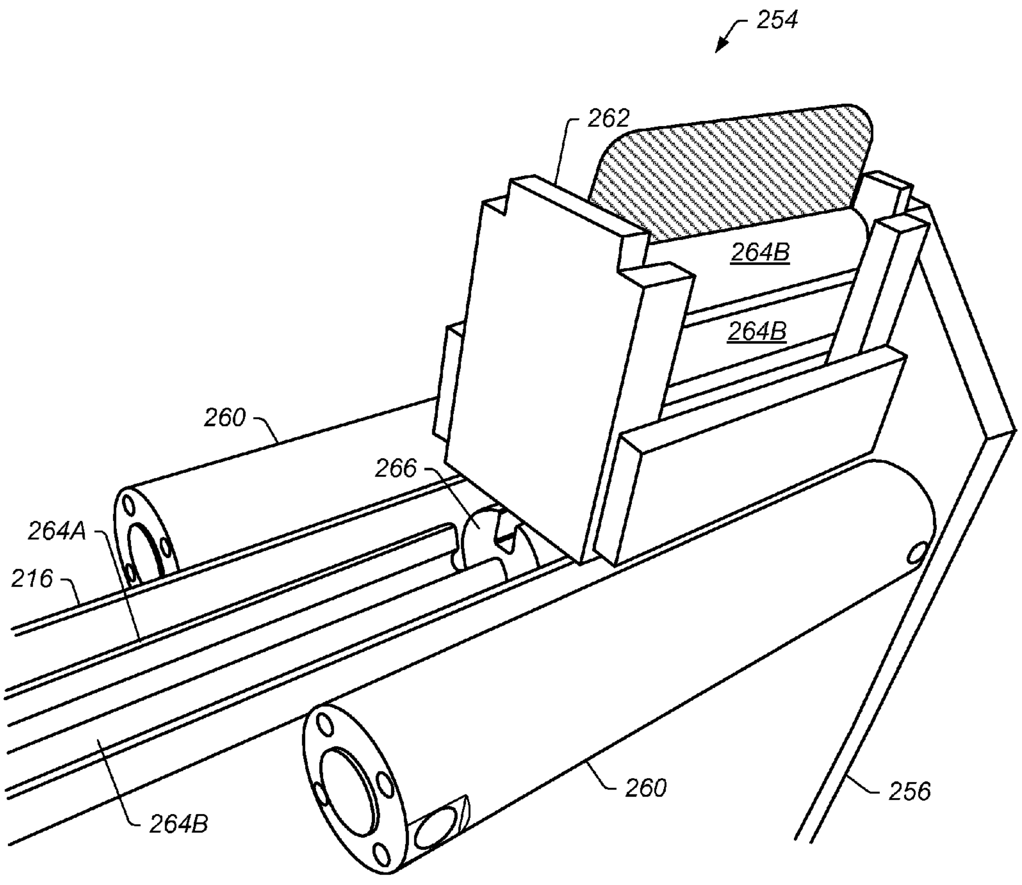

FIGS. 6-8 depict one embodiment of block pushing device 254 that may be used to provide axial force to blocks in the insulated conductor assembly. In certain embodiments, as shown in FIG. 6, device 254 includes insulated conductor holder 256, plunger guide 258, and air cylinders 260. Device 254 may be located in an assembly line used to make insulated conductor assemblies. In certain embodiments, device 254 is located at the part of the assembly line used to insert blocks into the jacket. For example, device 254 is located between the steps of longitudinally rolling the jacket strip into a partial cylindrical shape and insertion of the core into the insulated conductor assembly. After insertion of the core, the jacket containing the blocks and the core may be formed into a complete cylinder. In some embodiments, the core is inserted before the blocks and the blocks are inserted around the core and inside the jacket.

In certain embodiments, insulated conductor holder 256 is shaped to hold part of the jacket 216 and allow the jacket assembly to move through the insulated conductor holder while other parts of the jacket simultaneously move through other portions of the assembly line. Insulated conductor holder 256 may be coupled to plunger guide 258 and air cylinders 260.

In certain embodiments, block holder 262 is coupled to insulated conductor holder 256. Block holder 262 may be a device used to store and insert blocks 264 into jacket 216. In certain embodiments, blocks 264 are formed from two half-cylinder blocks 264A, 264B. Blocks 264 may be made from an electrical insulator suitable for use in the insulated conductor assembly such as, but not limited to, magnesium oxide. In some embodiments, blocks 264 are about 6" in length. The length of blocks 264 may, however, vary as desired or needed for the insulated conductor assembly.

A divider may be used to separate blocks 264A, 264B in block holder 262 so that the blocks may be properly inserted into jacket 216. As shown in FIG. 8, blocks 264A, 264B may be gravity fed from block holder 262 into jacket 216 as the jacket passes through insulated conductor holder 256. Blocks 264A, 264B may be inserted in a direct side-by-side arrangement into jacket 216 (after insertion, the blocks rest directly side-by-side horizontally in the jacket).

As blocks 264A, 264B are inserted into jacket 216, the blocks may be moved (pushed) towards previously inserted blocks to remove gaps between the blocks inside the jacket. Blocks 264A, 264B may be moved towards previously inserted blocks using plunger 266, shown in FIG. 8. Plunger 266 may be located inside jacket 216 such that the plunger provides pressure to the blocks inside the jacket and not to the jacket itself.

Figure 9:
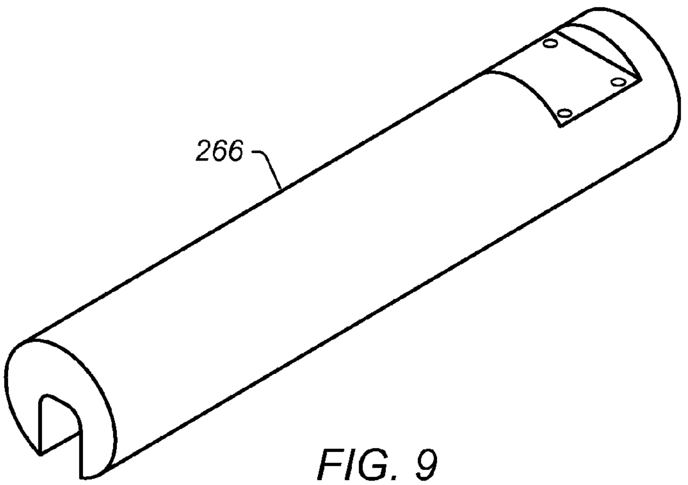
FIG. 9 depicts an embodiment of a plunger with a cross-sectional shape that allows the plunger to provide force on the blocks but not on the core inside the jacket.

In certain embodiments, plunger 266 has a cross-sectional shape that allows the plunger to move freely inside jacket 216 and provide axial force on the blocks without providing force on the core inside the jacket. FIG. 9 depicts an embodiment of plunger 266 with a cross-sectional shape that allows the plunger to provide force on the blocks but not on the core inside the jacket. In some embodiments, plunger 266 is made of ceramic or is coated with a ceramic material. An example of a ceramic material that may be used is zirconia toughened alumina (ZTA). Using a ceramic or ceramic coated plunger may inhibit abrasion of the blocks by the plunger when force is applied to the blocks by the plunger.

In certain embodiments, air cylinders 260 are coupled to plunger guide 258 with one or more rods (shown in FIGS. 6 and 7). Air cylinders 260 and plunger guide 258 may be inline with jacket 216 and plunger 266 to inhibit adding angular moment to the blocks or the jacket. Air cylinders 260 may be operated using bi-directional valves so that the air cylinders can be extended or retracted based on which side of the air cylinders is provided with positive air pressure. When air cylinders 260 are extended (as shown in FIG. 6), plunger guide 258 moves away from insulated conductor holder 256 so that plunger 266 is cleared out of the way and allows blocks 264A, 264B to be inserted (for example, dropped) into jacket 216 from block holder 262.

When air cylinders 260 retract (as shown in FIG. 7), plunger guide 258 moves towards to plunger 266 and plunger 266 provides a selected amount of force on blocks 264A, 264B. Plunger 266 provides the selected amount of force on blocks 264A, 264B to push the blocks onto blocks previously inserted into jacket 216. The amount of force provided by plunger 266 on blocks 264A, 264B may be selected to based on the factors such as, but not limited to, the speed of the jacket as it moves through the assembly line, the amount of force needed to inhibit gaps forming between adjacent blocks in the jacket, the maximum amount of force that may be applied to the blocks without damaging the blocks, or combinations thereof. For example, the selected amount of force may be between about 100 pounds of force and about 500 pounds of force (for example, about 400 pounds of force). In certain embodiments, the selected amount of force is the minimum amount of force needed to inhibit the gaps from existing between adjacent blocks in the jacket. The selected amount of force may be determined by the amount of air pressure provided to the air cylinders.

After blocks 264A, 264B are pushed against previously inserted blocks, air pressure in air cylinders 260 is reversed and the air cylinders extend such that plunger 266 is retracted and additional blocks are drop into jacket 216 from block holder 262. This process may be repeated until jacket 216 is filled with blocks up to a desired length for the insulated conductor assembly.

In certain embodiments, plunger 266 is moved back and forth (extended and retracted) using a cam that alternates the direction of air pressure provided to air cylinders 260. The cam may, for example, be coupled to a bi-directional valve used to operate the air cylinders. The cam may have a first position that operates the valve to extend the air cylinders and a second position that operates the valve to retract the air cylinders. The cam may be moved between the first and second positions by operation of the plunger such that the cam switches the operation of air cylinders between extension and retraction.

Providing the intermittent force on blocks 264A, 264B from the extension and retraction of plunger 266 provides the selected amount of force on the string of blocks inserted into jacket 216. Providing this force to the string of blocks in the jacket removes and inhibits gaps from forming between adjacent blocks. Inhibiting gaps between blocks reduces the potential for mechanical and/or electrical failure in the insulated conductor assembly.

Figure 10:
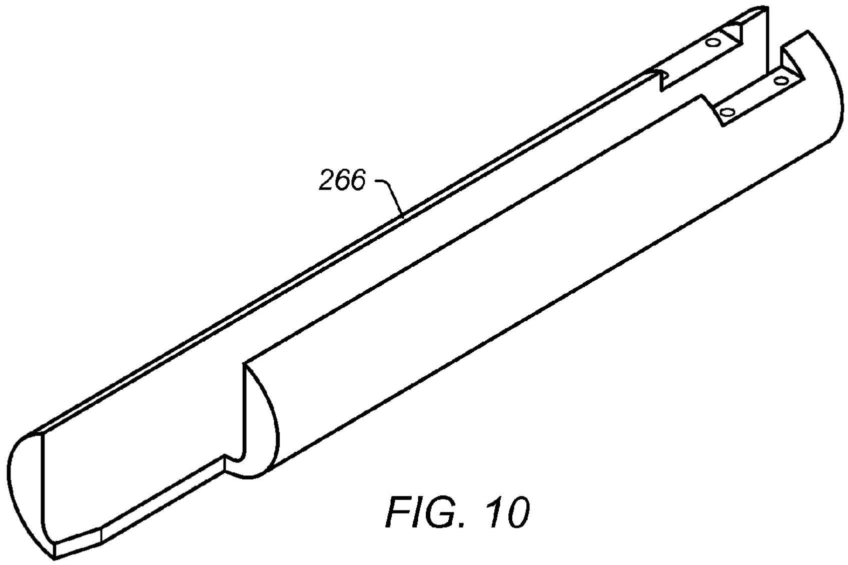
FIG. 10 depicts an embodiment of a plunger that may be used to push offset (staggered) blocks.
Figure 11:
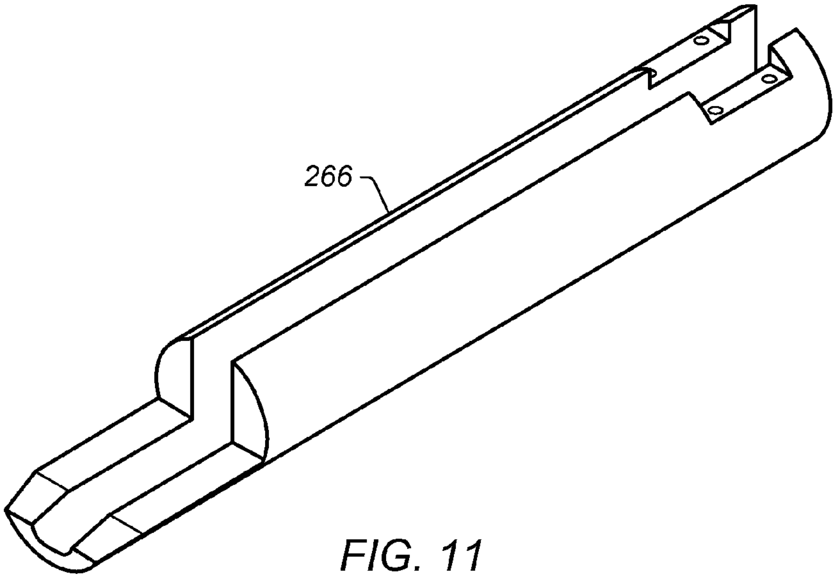
FIG. 11 depicts an embodiment of a plunger that may be used to push top/bottom arranged blocks.

In some embodiments, blocks 264A, 264B are inserted into jacket 216 in other methods besides the direct side-by-side arrangement described above. For example, the blocks may be inserted in a staggered side-by-side arrangement where the blocks are offset along the length of the jacket. In such an arrangement, the plunger may have a different shape to accommodate the offset blocks. For example, FIG. 10 depicts an embodiment of plunger 266 that may be used to push offset (staggered) blocks. As another example, the blocks may be inserted in a top/bottom arrangement (one half-cylinder block on top of another half-cylinder block). The top/bottom arrangement may have the blocks either directly on top of each other or in an offset (staggered) relationship. FIG. 11 depicts an embodiment of plunger 266 that may be used to push top/bottom arranged blocks. Offsetting or staggering the block inside the jacket may inhibit rotation of the blocks relative to blocks before or after the inserted blocks.

Another source of potential problems in insulated conductors with relatively long lengths (for example, lengths of 10 m or longer) is that the electrical properties of the electrical insulator may degrade over time. Any small change in an electrical property (for example, resistivity) may lead to failure of the insulated conductor. Since the electrical insulator used in the long length insulated conductor is typically made of several blocks of electrical insulator, as described above, improvements in the processes used to make the blocks of electrical insulator may increase the reliability of the insulated conductor. In certain embodiments, the electrical insulator is improved to have a resistivity that remains substantially constant over time during use of the insulated conductor (for example, during production of heat by an insulated conductor heater).

In some embodiments, electrical insulator blocks (such as magnesium oxide blocks) are purified to remove impurities that may cause degradation of the blocks over time. For example, raw material used for the electrical insulator blocks may be heated to higher temperatures to convert metal oxide impurities to elemental metal (for example, iron oxide impurities may be converted to elemental iron). Elemental metal may be removed from the raw electrical insulator material more easily than metal oxide. Thus, purity of the raw electrical insulator material may be improved by heating the raw material to higher temperatures before removal of the impurities. The raw material may be heated to higher temperatures by, for example, using a plasma discharge.

In some embodiments, the electrical insulator blocks are made using hot pressing, a method known in the art for making ceramics. Hot pressing of the electrical insulator blocks may get the raw material in the blocks to fuse at points of contact in the insulated conductor heater. Fusing of the blocks at points of contact may improve the electrical properties of the electrical insulator.

In some embodiments, the electrical insulator blocks are cooled in an oven using dried or purified air. Using dried or purified air may decrease the addition of impurities or moisture to the blocks during the cooling process. Removing moisture from the blocks may increase the reliability of electrical properties of the blocks.

In some embodiments, the electrical insulator blocks are not heat treated during the process of making the blocks. Not heat treating the blocks may maintain the resistivity in the blocks and inhibit degradation of the blocks over time. In some embodiments, the electrical insulator blocks are heated at slow heating rates to help maintain resistivity in the blocks.

In some embodiments, the core of the insulated conductor is coated with a material that inhibits migration of impurities into the electrical insulator of the insulated conductor. For example, coating of an Alloy 180 core with nickel or Inconel® 625 might inhibit migration of materials from the Alloy 180 into the electrical insulator. In some embodiments, the core is made of material that does not migrate into the electrical insulator. For example, a carbon steel core may not cause degradation of the electrical insulator over time.

In some embodiments, the electrical insulator is made from powdered raw material such as powdered magnesium oxide. Powdered magnesium oxide may resist degradation better than other types of magnesium oxide.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a core" includes a combination of two or more cores and reference to "a material" includes mixtures of materials.

In this patent, certain U.S. patents and U.S. patent applications have been incorporated by reference. The text of such U.S. patents and U.S. patent applications is, however, only incorporated by reference to the extent that no conflict exists between such text and the other statements and drawings set forth herein. In the event of such conflict, then any such conflicting text in such incorporated by reference U.S. patents and U.S. patent applications is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An insulated conductor heater, comprising:

an electrical conductor configured to produce heat when an electrical current is provided to the electrical conductor;

an electrical insulator at least partially surrounding the electrical conductor, wherein the electrical insulator comprises a resistivity that remains substantially constant, or increases, over time when the electrical conductor produces heat; and an outer electrical conductor at least partially surrounding the electrical insulator.

2. The heater of claim 1, wherein the electrical insulator comprises purified magnesium oxide.

3. The heater of claim 1, wherein the electrical insulator comprises powdered magnesium oxide.

4. The heater of claim 1, wherein the heater is configured to be located in an opening in a subsurface formation.

5. The heater of claim 1, wherein the heater is configured to be located in an opening in a subsurface formation and the heater is configured to provide heat to at least a portion of the subsurface formation.

6. An insulated conductor heater, comprising:

an electrical conductor configured to produce heat when an electrical current is provided to the electrical conductor;

an electrical insulator at least partially surrounding the electrical conductor, wherein the electrical insulator comprises one or more blocks of insulation, and wherein the blocks of insulation comprise a resistivity that remains substantially constant, or increases, over time when the electrical conductor produces heat; and an outer electrical conductor at least partially surrounding the electrical insulator.

7. The heater of claim 6, wherein the blocks of insulation comprise purified magnesium oxide blocks.

8. The heater of claim 6, wherein the blocks of insulation are formed from powdered magnesium oxide.

9. The heater of claim 6, wherein the heater is configured to be located in an opening in a subsurface formation.

10. The heater of claim 6, wherein the heater is configured to be located in an opening in a subsurface formation and the heater is configured to provide heat to at least a portion of the subsurface formation.

11. A method for forming at least part of an insulated conductor, comprising:

placing a first partially cylindrical portion of an electrical insulator between at least part of an elongated, cylindrical inner electrical conductor and at least part of a partially cylindrical, elongated outer electrical conductor;

placing at least one additional partially cylindrical portion of the electrical insulator between at least part of the inner electrical conductor and at least part of the partially formed outer electrical conductor, wherein the additional portion of the electrical insulator is horizontally displaced from the first portion of the electrical insulator along a length of the part of the elongated outer electrical conductor; and moving the additional portion of the electrical insulator towards the first portion of the electrical insulator with a selected amount of force such that the additional portion of the electrical insulator and the first portion of the electrical insulator are substantially compressed against each other.

12. The method of claim 11, further comprising mechanically or pneumatically moving the additional portion of the electrical insulator towards the first portion of the electrical insulator with the selected amount of force.

13. The method of claim 11, further comprising forming a substantially cylindrical, elongated outer electrical conductor from the part of the outer electrical conductor comprising the electrical insulator portions after moving the additional portion of the electrical insulator towards the first portion of the electrical insulator.

14. The method of claim 13, further comprising forming at least part of the electrical insulator after forming the substantially cylindrical, elongated outer electrical conductor.

15. The method of claim 11, further comprising forming at least part of the partially cylindrical, elongated outer electrical conductor from an elongated strip of an electrically conductive material.

16. The method of claim 11, further comprising locating the part of the elongated, cylindrical inner electrical conductor in the part of the partially cylindrical, elongated outer electrical conductor.

17. The heater of claim 1, wherein the electrical insulator comprises a plurality of blocks of electrical insulation horizontally displaced along a length of the electrical conductor.

18. The heater of claim 6, wherein the electrical insulator comprises a plurality of blocks of insulation horizontally displaced along a length of the electrical conductor.

19. The method of claim 11, further comprising:

placing at least a second additional partially cylindrical portion of the electrical insulator between at least part of the inner electrical conductor and at least part of the partially formed outer electrical conductor, wherein the second additional portion of the electrical insulator is horizontally displaced from the additional portion of the electrical insulator along a length of the part of the elongated outer electrical conductor; and moving the second additional portion of the electrical insulator towards the additional portion of the electrical insulator with a selected amount of force such that the second additional portion of the electrical insulator and the additional portion of the electrical insulator are substantially compressed against each other.

* * * * *